United States Patent
Conner et al.

(10) Patent No.: US 9,746,859 B2
(45) Date of Patent: *Aug. 29, 2017

(54) THERMOSTAT SYSTEM WITH SOFTWARE-REPURPOSABLE WIRING TERMINALS ADAPTABLE FOR HVAC SYSTEMS OF DIFFERENT RANGES OF COMPLEXITY

(71) Applicant: Google Inc., Mountain View, CA (US)

(72) Inventors: Brian J. Conner, San Jose, CA (US); Joseph E. Palmer, San Jose, CA (US); David Sloo, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 634 days.

This patent is subject to a terminal disclaimer.

(21) Appl. No.: 14/205,159

(22) Filed: Mar. 11, 2014

(65) Prior Publication Data
US 2014/0263679 A1 Sep. 18, 2014

Related U.S. Application Data

(63) Continuation of application No. 13/624,880, filed on Sep. 21, 2012, now Pat. No. 8,708,242.

(51) Int. Cl.
*F23N 5/20* (2006.01)
*G05D 23/00* (2006.01)
(Continued)

(52) U.S. Cl.
CPC ........ *G05D 23/1919* (2013.01); *F24F 11/006* (2013.01); *G05D 23/1902* (2013.01)

(58) Field of Classification Search
CPC .......................... G05D 23/1919; F24F 11/006
(Continued)

(56) References Cited

U.S. PATENT DOCUMENTS 4,316,577 A   2/1982 Adams et al.
4,528,459 A   7/1985 Wiegel
(Continued)

FOREIGN PATENT DOCUMENTS

DE   19609390   9/1997
EP    434926    7/1991
(Continued)

OTHER PUBLICATIONS

Aprilaire Electronic Thermostats Model 8355 User's Manual, Research Products Corporation, Dec. 2000, 16 pages.
(Continued)

*Primary Examiner* — Henry Crenshaw
(74) *Attorney, Agent, or Firm* — Kilpatrick Townsend & Stockton LLP

(57) ABSTRACT

An auxiliary hardware box is described that can be installed at or near the HVAC system. The auxiliary box includes a large number of wiring terminals, for example 16 or more, for connecting to a relatively large number of HVAC control wires. The auxiliary box can include a "train map" type graphic display that is visible to the installer and provides a graphical indication as to which relays or switches are currently open and which are currently closed. A small sleek visually pleasing thermostat is also described that can be connected either directly to an HVAC system or to the auxiliary box, and can automatically detect an purpose the connected wires according to which it is connected to.

20 Claims, 16 Drawing Sheets

(51) Int. Cl.
  *G05D 23/275* (2006.01)
  *F25D 21/02* (2006.01)
  *G05D 23/19* (2006.01)
  *F24F 11/00* (2006.01)

(58) Field of Classification Search
  USPC .................................. 236/51, 94; 62/129
  See application file for complete search history.

(56) References Cited

U.S. PATENT DOCUMENTS

| | | | |
|---|---|---|---|
| 4,689,718 A * | 8/1987 | Maue | B60R 16/0238 361/644 |
| 4,751,961 A | 6/1988 | Levine et al. | |
| 4,768,706 A | 9/1988 | Parfitt | |
| 4,898,229 A | 2/1990 | Brown et al. | |
| 4,948,040 A | 8/1990 | Kobayashi et al. | |
| 5,005,365 A | 4/1991 | Lynch | |
| 5,065,813 A | 11/1991 | Berkeley et al. | |
| 5,107,918 A | 4/1992 | McFarlane et al. | |
| 5,161,606 A | 11/1992 | Berkeley et al. | |
| 5,181,389 A | 1/1993 | Hanson et al. | |
| 5,251,813 A | 10/1993 | Kniepkamp | |
| 5,294,047 A | 3/1994 | Schwer et al. | |
| 5,318,224 A | 6/1994 | Darby et al. | |
| 5,381,950 A | 1/1995 | Aldridge | |
| 5,395,042 A | 3/1995 | Riley et al. | |
| 5,415,346 A | 5/1995 | Bishop | |
| 5,422,808 A | 6/1995 | Catanese, Jr. et al. | |
| 5,452,762 A | 9/1995 | Zillner, Jr. | |
| 5,456,407 A | 10/1995 | Stalsberg et al. | |
| 5,460,327 A | 10/1995 | Hill et al. | |
| 5,462,225 A | 10/1995 | Massara et al. | |
| 5,467,921 A | 11/1995 | Shreeve et al. | |
| 5,482,209 A | 1/1996 | Cochran et al. | |
| 5,485,954 A | 1/1996 | Guy et al. | |
| 5,555,927 A | 9/1996 | Shah | |
| 5,570,837 A | 11/1996 | Brown et al. | |
| 5,595,342 A | 1/1997 | McNair et al. | |
| 5,603,451 A | 2/1997 | Helander et al. | |
| 5,611,484 A | 3/1997 | Uhrich | |
| 5,627,531 A | 5/1997 | Posso et al. | |
| 5,635,896 A | 6/1997 | Tinsley et al. | |
| 5,646,349 A | 7/1997 | Twigg et al. | |
| 5,655,709 A | 8/1997 | Garnett et al. | |
| 5,673,850 A | 10/1997 | Uptegraph | |
| 5,808,602 A | 9/1998 | Sellers | |
| 5,931,378 A | 8/1999 | Schramm | |
| 5,950,709 A | 9/1999 | Krueger et al. | |
| 6,032,867 A | 3/2000 | Dushane et al. | |
| 6,089,310 A | 7/2000 | Toth et al. | |
| 6,102,749 A | 8/2000 | Lynn et al. | |
| 6,164,374 A | 12/2000 | Rhodes et al. | |
| 6,206,295 B1 | 3/2001 | LaCoste | |
| 6,213,404 B1 | 4/2001 | Dushane et al. | |
| 6,286,764 B1 | 9/2001 | Garvey et al. | |
| 6,298,285 B1 | 10/2001 | Addink et al. | |
| 6,315,211 B1 | 11/2001 | Sartain et al. | |
| 6,336,593 B1 * | 1/2002 | Bhatnagar | G05D 23/1917 236/78 R |
| 6,356,038 B2 | 3/2002 | Bishel | |
| 6,453,687 B2 | 9/2002 | Sharood et al. | |
| 6,502,758 B2 | 1/2003 | Cottrell | |
| 6,513,723 B1 | 2/2003 | Mueller et al. | |
| D471,825 S | 3/2003 | Peabody | |
| 6,619,055 B1 * | 9/2003 | Addy | F24F 11/006 236/46 R |
| 6,622,925 B2 | 9/2003 | Carner et al. | |
| 6,644,557 B1 | 11/2003 | Jacobs | |
| 6,798,341 B1 | 9/2004 | Eckel et al. | |
| 6,851,621 B1 | 2/2005 | Wacker et al. | |
| 6,851,967 B2 | 2/2005 | Miyoshi et al. | |
| D503,631 S | 4/2005 | Peabody | |
| 6,886,754 B2 | 5/2005 | Smith et al. | |
| 6,951,306 B2 | 10/2005 | DeLuca | |
| 6,956,463 B2 | 10/2005 | Crenella et al. | |
| 6,997,390 B2 | 2/2006 | Alles | |
| 7,000,849 B2 | 2/2006 | Ashworth et al. | |
| 7,055,759 B2 | 6/2006 | Wacker et al. | |
| 7,083,109 B2 | 8/2006 | Pouchak | |
| 7,114,554 B2 | 10/2006 | Bergman et al. | |
| 7,141,748 B2 | 11/2006 | Tanaka et al. | |
| 7,156,318 B1 | 1/2007 | Rosen | |
| 7,159,790 B2 | 1/2007 | Schwendinger et al. | |
| 7,167,079 B2 | 1/2007 | Smyth et al. | |
| 7,174,239 B2 | 2/2007 | Butler et al. | |
| 7,181,317 B2 | 2/2007 | Amundson et al. | |
| 7,258,280 B2 | 8/2007 | Wolfson | |
| 7,264,175 B2 | 9/2007 | Schwendinger et al. | |
| 7,287,709 B2 | 10/2007 | Proffitt et al. | |
| 7,299,996 B2 | 11/2007 | Garrett et al. | |
| 7,333,880 B2 | 2/2008 | Brewster et al. | |
| D566,587 S | 4/2008 | Rosen | |
| 7,360,370 B2 | 4/2008 | Shah et al. | |
| 7,451,937 B2 | 11/2008 | Flood et al. | |
| 7,455,240 B2 | 11/2008 | Chapman, Jr. et al. | |
| 7,476,988 B2 | 1/2009 | Mulhouse et al. | |
| 7,509,753 B2 | 3/2009 | Nicosia et al. | |
| 7,510,126 B2 | 3/2009 | Rossi et al. | |
| 7,537,171 B2 | 5/2009 | Mueller et al. | |
| 7,555,364 B2 | 6/2009 | Poth et al. | |
| 7,558,648 B2 | 7/2009 | Hoglund et al. | |
| 7,562,536 B2 | 7/2009 | Harrod et al. | |
| 7,571,865 B2 | 8/2009 | Nicodem et al. | |
| 7,575,179 B2 | 8/2009 | Morrow et al. | |
| 7,584,899 B2 | 9/2009 | De Pauw et al. | |
| 7,600,694 B2 | 10/2009 | Helt et al. | |
| D603,277 S | 11/2009 | Clausen et al. | |
| 7,624,931 B2 | 12/2009 | Chapman, Jr. et al. | |
| 7,634,504 B2 | 12/2009 | Amundson | |
| 7,641,126 B2 | 1/2010 | Schultz et al. | |
| 7,648,077 B2 | 1/2010 | Rossi et al. | |
| 7,673,809 B2 | 3/2010 | Juntunen | |
| 7,693,582 B2 | 4/2010 | Bergman et al. | |
| D614,976 S | 5/2010 | Skafdrup et al. | |
| 7,726,581 B2 | 6/2010 | Naujok et al. | |
| 7,748,640 B2 | 7/2010 | Roher et al. | |
| 7,775,452 B2 | 8/2010 | Shah et al. | |
| 7,841,542 B1 | 11/2010 | Rosen | |
| 7,844,764 B2 | 11/2010 | Williams | |
| 7,845,576 B2 | 12/2010 | Siddaramanna et al. | |
| 7,847,681 B2 | 12/2010 | Singhal et al. | |
| 7,900,849 B2 | 3/2011 | Barton et al. | |
| 7,904,209 B2 | 3/2011 | Podgorny et al. | |
| 7,904,830 B2 | 3/2011 | Hoglund et al. | |
| 8,067,912 B2 | 11/2011 | Mullin | |
| D651,529 S | 1/2012 | Mongell et al. | |
| 8,195,313 B1 | 6/2012 | Fadell et al. | |
| 8,280,536 B1 | 10/2012 | Fadell et al. | |
| 8,442,695 B2 | 5/2013 | Imes et al. | |
| 8,708,242 B2 | 4/2014 | Conner et al. | |
| 2002/0005435 A1 | 1/2002 | Cottrell | |
| 2003/0037555 A1 * | 2/2003 | Street | F25B 49/02 62/175 |
| 2003/0069648 A1 | 4/2003 | Douglas et al. | |
| 2003/0090243 A1 | 5/2003 | Atherton | |
| 2003/0112262 A1 | 6/2003 | Adatia et al. | |
| 2004/0012477 A1 * | 1/2004 | Engler | G05D 23/1902 337/344 |
| 2004/0034484 A1 | 2/2004 | Solomita, Jr. et al. | |
| 2004/0130454 A1 | 7/2004 | Barton | |
| 2004/0193324 A1 | 9/2004 | Hoog et al. | |
| 2004/0238651 A1 | 12/2004 | Juntunen et al. | |
| 2004/0245352 A1 | 12/2004 | Smith | |
| 2004/0256472 A1 | 12/2004 | DeLuca | |
| 2005/0040250 A1 | 2/2005 | Wruck | |
| 2005/0043907 A1 | 2/2005 | Eckel et al. | |
| 2005/0119793 A1 | 6/2005 | Amundson et al. | |
| 2005/0145705 A1 * | 7/2005 | Shah | F24F 11/0086 236/51 |
| 2005/0159846 A1 | 7/2005 | Van Ostrand et al. | |
| 2005/0159847 A1 * | 7/2005 | Shah | G05B 15/02 700/276 |
| 2005/0204997 A1 | 9/2005 | Fournier | |

(56) References Cited

U.S. PATENT DOCUMENTS

| | | |
|---|---|---|
| 2005/0270151 A1 | 12/2005 | Winick |
| 2006/0090066 A1 | 4/2006 | Maze et al. |
| 2006/0102732 A1* | 5/2006 | Garrett .............. G05D 23/1905 236/94 |
| 2006/0186214 A1 | 8/2006 | Simon et al. |
| 2006/0196953 A1* | 9/2006 | Simon ............... G05D 23/1934 236/46 R |
| 2007/0001830 A1 | 1/2007 | Dagci et al. |
| 2007/0045430 A1 | 3/2007 | Chapman et al. |
| 2007/0045432 A1 | 3/2007 | Juntunen |
| 2007/0045433 A1 | 3/2007 | Chapman et al. |
| 2007/0045441 A1 | 3/2007 | Ashworth et al. |
| 2007/0045444 A1 | 3/2007 | Gray et al. |
| 2007/0050732 A1 | 3/2007 | Chapman et al. |
| 2007/0115902 A1 | 5/2007 | Shamoon et al. |
| 2007/0131787 A1 | 6/2007 | Rossi et al. |
| 2007/0157639 A1* | 7/2007 | Harrod ................ F24F 11/0086 62/129 |
| 2007/0158442 A1 | 7/2007 | Chapman et al. |
| 2007/0173978 A1 | 7/2007 | Fein et al. |
| 2007/0183475 A1 | 8/2007 | Hutcherson |
| 2007/0183478 A1* | 8/2007 | Becker .................. G01K 15/00 374/183 |
| 2007/0208461 A1 | 9/2007 | Chase |
| 2007/0221741 A1* | 9/2007 | Wagner ................ F24F 11/0086 236/94 |
| 2007/0225867 A1 | 9/2007 | Moorer et al. |
| 2007/0227721 A1 | 10/2007 | Springer et al. |
| 2007/0228183 A1 | 10/2007 | Kennedy et al. |
| 2007/0241203 A1 | 10/2007 | Wagner et al. |
| 2007/0257120 A1 | 11/2007 | Chapman et al. |
| 2007/0296280 A1 | 12/2007 | Sorg et al. |
| 2008/0015742 A1 | 1/2008 | Kulyk et al. |
| 2008/0054082 A1 | 3/2008 | Evans et al. |
| 2008/0094010 A1* | 4/2008 | Black .................... H02M 7/538 315/307 |
| 2008/0099568 A1* | 5/2008 | Nicodem ............. F24F 11/0012 236/51 |
| 2008/0128523 A1 | 6/2008 | Hoglund et al. |
| 2008/0147242 A1* | 6/2008 | Roher .................. F24F 11/0012 700/278 |
| 2008/0161977 A1 | 7/2008 | Takach et al. |
| 2008/0185450 A1 | 8/2008 | Kwon et al. |
| 2008/0245480 A1 | 10/2008 | Knight et al. |
| 2008/0290183 A1 | 11/2008 | Laberge et al. |
| 2009/0001180 A1 | 1/2009 | Siddaramanna et al. |
| 2009/0057425 A1 | 3/2009 | Sullivan et al. |
| 2009/0099697 A1 | 4/2009 | Li et al. |
| 2009/0140056 A1 | 6/2009 | Leen |
| 2009/0140057 A1 | 6/2009 | Leen |
| 2009/0140064 A1 | 6/2009 | Schultz et al. |
| 2009/0140065 A1 | 6/2009 | Juntunen et al. |
| 2009/0143879 A1 | 6/2009 | Amundson et al. |
| 2009/0143880 A1 | 6/2009 | Amundson et al. |
| 2009/0143916 A1 | 6/2009 | Boll et al. |
| 2009/0194601 A1 | 8/2009 | Flohr |
| 2009/0236433 A1 | 9/2009 | Mueller et al. |
| 2009/0259713 A1 | 10/2009 | Blumrich et al. |
| 2009/0261174 A1 | 10/2009 | Butler et al. |
| 2009/0283603 A1 | 11/2009 | Peterson et al. |
| 2010/0000239 A1 | 1/2010 | Lifson et al. |
| 2010/0006660 A1 | 1/2010 | Leen et al. |
| 2010/0070099 A1 | 3/2010 | Watson et al. |
| 2010/0076605 A1 | 3/2010 | Harrod et al. |
| 2010/0084482 A1 | 4/2010 | Kennedy et al. |
| 2010/0114382 A1 | 5/2010 | Ha et al. |
| 2010/0131112 A1 | 5/2010 | Amundson et al. |
| 2010/0163635 A1 | 7/2010 | Ye |
| 2010/0182743 A1 | 7/2010 | Roher |
| 2010/0193592 A1 | 8/2010 | Simon et al. |
| 2010/0198425 A1 | 8/2010 | Donovan |
| 2010/0250009 A1 | 9/2010 | Lifson et al. |
| 2010/0261465 A1 | 10/2010 | Rhoads et al. |
| 2010/0298985 A1 | 11/2010 | Hess et al. |
| 2010/0318227 A1 | 12/2010 | Steinberg et al. |
| 2011/0015798 A1 | 1/2011 | Golden et al. |
| 2011/0015802 A1 | 1/2011 | Imes |
| 2011/0137467 A1 | 6/2011 | Leen et al. |
| 2011/0160918 A1 | 6/2011 | McMasters et al. |
| 2011/0253796 A1 | 10/2011 | Posa et al. |
| 2012/0248211 A1 | 10/2012 | Warren et al. |
| 2012/0258776 A1 | 10/2012 | Lord et al. |
| 2014/0084072 A1 | 3/2014 | Conner et al. |

FOREIGN PATENT DOCUMENTS

| | | |
|---|---|---|
| EP | 447458 | 9/1991 |
| EP | 510807 | 10/1992 |
| EP | 660287 | 6/1995 |
| EP | 690363 | 1/1996 |
| EP | 720077 | 7/1996 |
| EP | 802471 | 10/1997 |
| EP | 1065079 | 1/2001 |
| EP | 1731984 | 12/2006 |
| EP | 2157492 | 2/2010 |
| EP | 2302326 | 3/2011 |
| GB | 2212317 | 5/1992 |
| JP | 59106311 | 6/1984 |
| JP | 09298780 | 11/1997 |
| JP | 2002087050 | 3/2002 |
| JP | 2003054290 | 2/2003 |
| NL | 1024986 | 6/2005 |
| SI | 20556 | 10/2001 |
| WO | 0248851 | 6/2002 |
| WO | 2005019740 | 3/2005 |
| WO | 2007027554 | 3/2007 |
| WO | 2008054938 | 5/2008 |
| WO | 2009073496 | 6/2009 |
| WO | 2011128416 | 10/2011 |

OTHER PUBLICATIONS

Braeburn 5300 Installer Guide, Braeburn Systems, LLC, Dec. 9, 2009, 10 pages.
Braeburn Model 5200, Braeburn Systems, LLC, Jul. 20, 2011, 11 pages.
Ecobee Smart Si Thermostat Installation Manual, Ecobee, Apr. 3, 2012, 40 pages.
Ecobee Smart Si Thermostat User Manual, Ecobee, Apr. 3, 2012, 44 pages.
Ecobee Smart Thermostat Installation Manual, Jun. 29, 2011, 20 pages.
Ecobee Smart Thermostat User Manual, May 11, 2010, 20 pages.
Electric Heat Lock Out on Heat Pumps, Washington State University Extension Energy Program, Apr. 2010, pp. 1-3.
Energy Joule, retrieved from the Internet: <http://web.archive.org/web/20110723210421/http://www.ambientdevices.com/products/energyjoule.html> [retrieved on Aug. 1, 2012], Ambient Devices, Jul. 23, 2011, 3 pages.
Honeywell CT2700, An Electronic Round Programmable Thermostat—User's Guide, Honeywell, Inc., 1997, 8 pages.
Honeywell CT8775A,C, The digital Round Non-Programmable Thermostats—Owner's Guide, Honeywell International Inc., 2003, 20 pages.
Honeywell Installation Guide FocusPRO TH6000 Series, Honeywell International, Inc., Jan. 5, 2012, 24 pages.
Honeywell Operating Manual FocusPRO TH6000 Series, Honeywell International, Inc., Mar. 25, 2011, 80 pages.
Honeywell Prestige IAQ Product Data 2, Honeywell International, Inc., Jan. 12, 2012, 126 pages.
Honeywell Prestige THX9321 and TXH9421 Product Data, Honeywell International, Inc., 68-0311, Jan. 2012, 126 pages.
Honeywell Prestige THX9321-9421 Operating Manual, Honeywell International, Inc., Jul. 6, 2011, 120 pages.
Honeywell T8700C, An Electronic Round Programmable Thermostat—Owner's Guide, Honeywell, Inc., 1997, 12 pages.
Honeywell T8775 the Digital Round Thermostat, Honeywell, 2003, 2 pages.

(56) References Cited

OTHER PUBLICATIONS

Honeywell T8775AC Digital Round Thermostat Manual No. 69-1679EF-1, www.honeywell.com/yourhome, Jun. 2004, pp. 1-16.
Hunter Internet Thermostat Installation Guide, Hunter Fan Co., Aug. 14, 2012, 8 pages.
ICY 3815TT-001 Timer-Thermostat Package Box, ICY BV Product Bar Code No. 8717953007902, 2009, 2 pages.
Installation and Start-Up Instructions Evolution Control SYSTXB-BUID01, Bryant Heating & Cooling Systems, 2004, 12 pages.
Introducing the New Smart Si Thermostat, Datasheet [online], retrieved from the Internet: <URL: https://www.ecobee.com/solutions/home/smart-si/> [retrieved on Feb. 25, 2013], Ecobee, Mar. 12, 2012, 4 pages.
Lennox ComfortSense 5000 Owners Guide, Lennox Industries, Inc., Feb. 2008, 32 pages.
Lennox ComfortSense 7000 Owners Guide, Lennox Industries, Inc., May 2009, 15 pages.
Lennox iComfort Manual, Lennox Industries, Inc., Dec. 2010, 20 pages.
Lux PSPU732T Manual, LUX Products Corporation, Jan. 6, 2009, 48 pages.
NetX RP32-WIFI Network Thermostat Consumer Brochure, Network Thermostat, May 2011, 2 pages.
NetX RP32-WIFI Network Thermostat Specification Sheet, Network Thermostat, Feb. 28, 2012, 2 pages.
RobertShaw Product Manual 9620, Maple Chase Company, Jun. 12, 2001, 14 pages.
RobertShaw Product Manual 9825i2, Maple Chase Company, Jul. 17, 2006, 36 pages.
SYSTXCCUIZ01-V Infinity Control Installation Instructions, Carrier Corp, May 31, 2012, 20 pages.
T8611G Chronotherm IV Deluxe Programmable Heat Pump Thermostat Product Data, Honeywell International Inc., Oct. 1997, 24 pages.
TB-PAC, TB-PHP, Base Series Programmable Thermostats, Carrier Corp, May 14, 2012, 8 pages.
The Clever Thermostat, ICY BV Web Page, http://www.icy.nl/en/consumer/products/clever-thermostat, ICY BV, 2012, 1 page.
The Clever Thermostat User Manual and Installation Guide, ICY BV ICY3815 Timer-Thermostat, 2009, pp. 1-36.
The Perfect Climate Comfort Center PC8900A W8900A-C Product Data Sheet, Honeywell International Inc., Apr. 2001, 44 pages.
TP-PAC, TP-PHP, TP-NAC, TP-NHP Performance Series AC/HP Thermostat Installation Instructions, Carrier Corp, Sep. 2007, 56 pages.
Trane Communicating Thermostats for Fan Coil, Trane, May 2011, 32 pages.
Trane Communicating Thermostats for Heat Pump Control, Trane, May 2011, 32 pages.
Trane Install XL600 Installation Manual, Trane, Mar. 2006, 16 pages.
Trane XL950 Installation Guide, Trane, Mar. 2011, 20 pages.
Venstar T2900 Manual, Venstar, Inc., Apr. 2008, 113 pages.
Venstar T5800 Manual, Venstar, Inc., Sep. 7, 2011, 63 pages.
VisionPRO TH8000 Series Installation Guide, Honeywell International, Inc., Jan. 2012, 12 pages.
VisionPRO TH8000 Series Operating Manual, Honeywell International, Inc., Mar. 2011, 96 pages.
VisionPRO Wi-Fi Programmable Thermostat User Guide, Honeywell International, Inc., Aug. 2012, 48 pages.
White Rodgers (Emerson) Model 1F81-261 Installation and Operating Instructions, White Rodgers, Apr. 15, 2010, 8 pages.
White Rodgers (Emerson) Model IF98EZ-1621 Homeowner's User Guide, White Rodgers, Jan. 25, 2012, 28 pages.
U.S. Appl. No. 13/624,880, Final Office Action mailed on Sep. 6, 2013, 22 pages.
U.S. Appl. No. 13/624,880, Non-Final Office Action mailed on Feb. 26, 2013, 29 pages.
U.S. Appl. No. 13/624,880, Notice of Allowance mailed on Dec. 11, 2013, 16 pages.
U.S. Appl. No. 60/512,886, Volkswagen Rotary Knob for Motor Vehicle—English Translation of German Application filed Oct. 20, 2003.
Allen et al., Real-Time Earthquake Detection and Hazard Assessment by ElarmS Across California, Geophysical Research Letters, vol. 36, L00B08, 2009, pp. 1-6.
Arens et al., Demand Response Electrical Appliance Manager—User Interface Design, Development and Testing, Poster, Demand Response Enabling Technology Development, University of California Berkeley, 2005, 1 page.
Arens et al., Demand Response Enabled Thermostat—Control Strategies and Interface, Demand Response Enabling Technology Development Poster, University of California Berkeley, 2004, 1 page.
Arens et al., Demand Response Enabling Technology Development, Phase I Report: Jun. 2003-Nov. 2005, University of California Berkeley, Apr. 4, 2006, pp. 1-108.
Arens et al., New Thermostat Demand Response Enabling Technology, Poster, University of California Berkeley, Jun. 10, 2004.
Auslander et al., UC Berkeley DR Research Energy Management Group, Power Point Presentation, DR ETD Workshop, State of California Energy Commission, Jun. 11, 2007, pp. 1-35.
Bryant, SYSTXBBUID01 Evolution Control Installation Instructions, Feb. 2004, 12 pages.
Chen et al., Demand Response-Enabled Residential Thermostat Controls, Abstract, ACEEE Summer Study on Energy Efficiency in Buildings, Mechanical Engineering Dept. and Architecture Dept., University of California Berkeley, 2008, pp. 1-24 through 1-36.
Deleeuw, Ecobee WiFi enabled Smart Thermostat Part 2: The Features Review, retrieved from the Internet: <URL: http://www.homenetworkenabled.com/content.php?136-ecobee-WiFi-enabled-Smart-Thermostat-Part-2-The-Features-review> [retrieved on Jan. 8, 2013], Dec. 2, 2011, 5 pages.
Detroitborg, Nest Learning Thermostat: Unboxing and Review [online], uploaded on Feb. 2012, retrieved from the Internet: <URL: http://www.youtube.com/watch?v=KrgcOL4oLzc> [retrieved on Aug. 22, 2013], 4 pages.
Gao et al., The Self-Programming Thermostat: Optimizing Setback Schedules Based on Home Occupancy Patterns, In Proceedings of the First ACM Workshop on Embedded Sensing Systems for Energy-Efficiency in Buildings, Nov. 3, 2009, 6 pages.
Green, Thermo Heat Tech Cool, Popular Mechanics Electronic Thermostat Guide, Oct. 1985, pp. 155-158.
Loisos et al., Buildings End-Use Energy Efficiency: Alternatives to Compressor Cooling, California Energy Commission, Public Interest Energy Research, Jan. 2000, 80 pages.
Lu et al., The Smart Thermostat: Using Occupancy Sensors to Save Energy in Homes, In Proceedings of the 8th ACM Conference on Embedded Networked Sensor Systems, Nov. 3-5, 2010, pp. 211-224.
Meier et al., Thermostat Interface Usability: A Survey, Ernest Orlando Lawrence Berkeley National Laboratory, Environmental Energy Technologies Division, Berkeley California, Sep. 2010, pp. 1-73.
Mozer, The Neural Network House: An Environmental that Adapts to its Inhabitants, Proceedings of the American Association for Artificial Intelligence SS-98-02, 1998, pp. 110-114.
International Patent Application No. PCT/US2011/061379, International Search Report mailed on Mar. 30, 2012, 2 pages.
Peffer et al., A Tale of Two Houses: The Human Dimension of Demand Response Enabling Technology from a Case Study of Adaptive Wireless Thermostat, Abstract, ACEEE Summer Study on Energy Efficiency in Buildings, Architecture Dept. and Mechanical Engineering Dept., University of California Berkeley., 2008, pp. 7-242 through 7-253.
Peffer et al., Smart Comfort at Home: Design of a Residential Thermostat to Achieve Thermal Comfort, and Save Money and Peak Energy, University of California Berkeley, Mar. 2007, 1 page.
Salus, S-Series Digital Thermostat Instruction Manual-ST620 Model No. Instruction Manual, Version 005, www.salus-tech.com, Apr. 29, 2010, 24 pages.

(56) References Cited

OTHER PUBLICATIONS

Sanford, iPod (Click Wheel) (2004), retrieved from the Internet: <URL: http://apple-history.com/ipod> [retrieved on Apr. 9, 2012], Apple Inc., 2012, 2 pages.
Wright et al., DR ETD—Summary of New Thermostat, TempNode, & New Meter Power Point Presentation (UC Berkeley Project), Public Interest Energy Research, University of California Berkeley, 2005, pp. 1-49.

* cited by examiner

THERMOSTAT SYSTEM WITH SOFTWARE-REPURPOSABLE WIRING TERMINALS ADAPTABLE FOR HVAC SYSTEMS OF DIFFERENT RANGES OF COMPLEXITY

CROSS-REFERENCES TO RELATED APPLICATIONS

This application is a Continuation of U.S. patent application Ser. No. 13/624,880, filed Sep. 21,2012, and entitled "THERMOSTAT SYSTEM WITH SOFTWARE-REPURPOSABLE WIRING TERMINALS ADAPTABLE FOR HVAC SYSTEMS OF DIFFERENT RANGES OF COMPLEXITY," the entire contents of which is herein incorporated by reference for all purposes.

This patent specification relates to systems, methods, and related computer program products for the monitoring and control of energy-consuming systems or other resource-consuming systems. More particularly, this patent specification relates to a thermostat for connection either directly to an HVAC system or to an intermediate auxiliary HVAC control unit.

BACKGROUND

When connecting to a thermostat to some types of modern residential HVAC systems there are sometimes quite a few wires used. In some cases there can be as many as 16 wires. In designing a sleek thermostat that is visually pleasing when wall mounted in a home, it is desirable that the thermostat is not overly large. Thus, there exists a design problem as to how to connect a large number of HVAC control wires to a relatively small thermostat.

Additionally, in some cases the circuitry required to generate some types of control signals can use a relatively large amount of space on the thermostat. For example, in some systems where a "V" wire is used for variable control of fan speed, a relatively large amount of circuitry may be used within the thermostat to generate the signal.

Furthermore, in some cases when a common wire is not present, certain types of thermostat relays and/or switches make power stealing impractical. In some cases adding a common wire between the HVAC system and the thermostat is a costly endeavor.

It is to be appreciated that although exemplary embodiments are presented herein for the particular context of HVAC system control, there are a wide variety of other resource usage contexts for which the embodiments are readily applicable including, but not limited to, water usage, air usage, the usage of other natural resources, and the usage of other (i.e., non-HVAC-related) forms of energy, as would be apparent to the skilled artisan in view of the present disclosure. Therefore, such application of the embodiments in such other resource usage contexts is not outside the scope of the present teachings.

SUMMARY

According to one or more embodiments, a thermostat adapted for either direct connection to an HVAC system or to an intermediate auxiliary HVAC control unit is described. The thermostat includes: a plurality of wiring terminals each adapted to make electrical connection with one of a plurality of control wires running between a first location where the thermostat is installed and a second location where an HVAC system is installed; and processors and circuitry configured and programmed to communicate with an auxiliary unit if installed at the second location via one or more of the plurality of control wires connected to one or more of the wiring terminals, the auxiliary unit being directly electrically connected to an installed HVAC system via a plurality of HVAC control wires. The processors and circuitry are further configured and programmed to control the HVAC system directly without an auxiliary unit when the plurality of control wires are connected directly to both the plurality of wiring terminals and to the HVAC system.

According to some embodiments the communication between the thermostat and the auxiliary unit is bi-directional. According to some embodiments, automatic detection of connection to an auxiliary unit is provided, for example based on an assessment of which of the one or more wiring terminals have wires connected thereto. When the connection to an auxiliary unit is detected the wires are automatically re-purposes to communicate with and receive electrical power from an auxiliary unit.

According to some embodiments the auxiliary unit is mounted in close proximity (e.g. within 5 meters) of an air mover or furnace of the HVAC system, and may be directly on a housing of the air mover or furnace. The number of wires used for connection between the wiring terminals and the auxiliary unit, is preferably substantially fewer than would be used for a connection from the wiring terminals directly to the HVAC system. According to some embodiments only 3 or 4 wires are used to interconnect the thermostat to the auxiliary unit. According to some embodiments, the auxiliary unit is capable of controlling an HVAC system having variable fan speed using a pulse-width-modulated control signal. The thermostat when mounted on a wall preferably occupies no more than 100 square centimeters, and the plurality of wiring terminals are configured for tool-free wire connection.

According to some embodiments, an auxiliary HVAC control unit for controlling an HVAC system is described. The unit includes: a first set of wiring terminals each adapted to make electrical connection with one of a first plurality wires running between a first location where a thermostat is installed and a second location where the auxiliary unit the HVAC system is installed; a second set of wiring terminals each adapted to make electrical connection with one of second plurality of wires running between the auxiliary unit and the HVAC system; and a graphic display visible to a human viewing the display, the display indicating to the human which of the second set of wiring terminals are currently electrically connected to each other.

According to some embodiments the unit also includes a plurality of relays used to open and close connections between conductors leading to the second set of wiring terminals, and the graphic display includes a plurality of visible LEDs that indicate status of one or more of the relays. According to some embodiments, the auxiliary unit can connect to one or more wires leading to one or more remote temperature sensors (such as an outdoor air temperature, indoor air temperature, and/or return air temperature).

It will be appreciated that these systems and methods are novel, as are applications thereof and many of the components, systems, methods and algorithms employed and included therein. It should be appreciated that embodiments of the presently described inventive body of work can be implemented in numerous ways, including as processes, apparata, systems, devices, methods, computer readable media, computational algorithms, embedded or distributed software and/or as a combination thereof. Several illustrative embodiments are described below.

BRIEF DESCRIPTION OF THE DRAWINGS

The inventive body of work will be readily understood by referring to the following detailed description in conjunction with the accompanying drawings, in which.

DETAILED DESCRIPTION

Figure 1:
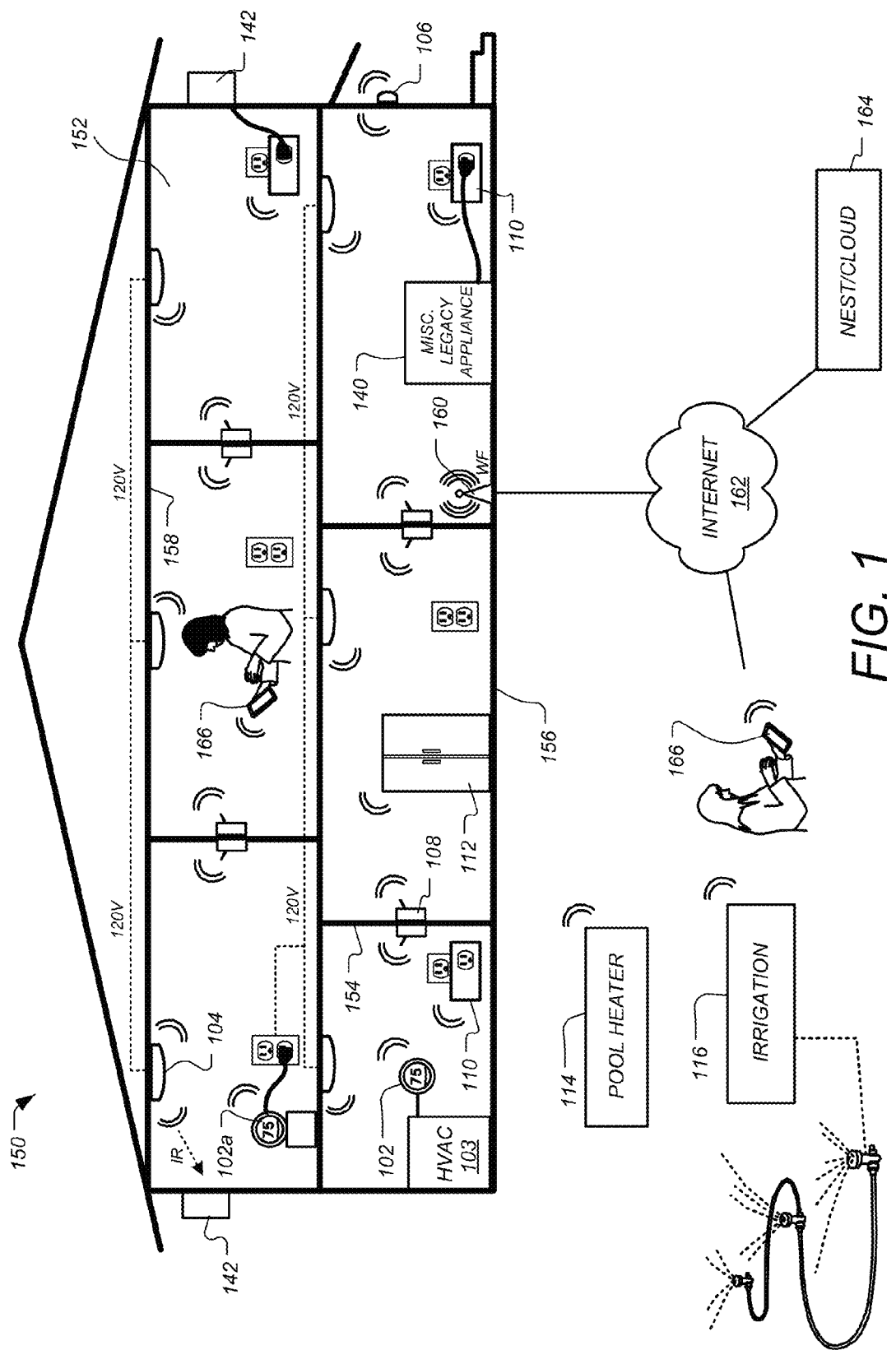
FIG. 1 illustrates an example of a smart home environment within which one or more of the devices, methods, systems, services, and/or computer program products described further herein can be applicable.

The subject matter of this patent specification relates to the subject matter of the following commonly assigned applications, each of which is incorporated by reference herein: U.S. Ser. No. 13/034,666 filed Feb. 24, 2011; and International Application Ser. No. PCT/US12/00007 filed Jan. 3, 2012. The above-referenced patent applications are collectively referenced herein as "the commonly assigned incorporated applications."

A detailed description of the inventive body of work is provided herein. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body of work.

As used herein the term "HVAC" includes systems providing both heating and cooling, heating only, cooling only, as well as systems that provide other occupant comfort and/or conditioning functionality such as humidification, dehumidification and ventilation.

As used herein the terms power "harvesting," "sharing" and "stealing" when referring to HVAC thermostats all refer to thermostats that are designed to derive power from the power transformer through the equipment load without using a direct or common wire source directly from the transformer.

As used herein the term "residential" when referring to an HVAC system means a type of HVAC system that is suitable to heat, cool and/or otherwise condition the interior of a building that is primarily used as a single family dwelling. An example of a cooling system that would be considered residential would have a cooling capacity of less than about 5 tons of refrigeration (1 ton of refrigeration=12,000 Btu/h).

As used herein the term "light commercial" when referring to an HVAC system means a type of HVAC system that is suitable to heat, cool and/or otherwise condition the interior of a building that is primarily used for commercial purposes, but is of a size and construction that a residential HVAC system is considered suitable. An example of a cooling system that would be considered residential would have a cooling capacity of less than about 5 tons of refrigeration.

As used herein the term "thermostat" means a device or system for regulating parameters such as temperature and/or humidity within at least a part of an enclosure. The term "thermostat" may include a control unit for a heating and/or cooling system or a component part of a heater or air conditioner. As used herein the term "thermostat" can also refer generally to a versatile sensing and control unit (VSCU unit) that is configured and adapted to provide sophisticated, customized, energy-saving HVAC control functionality while at the same time being visually appealing, non-intimidating, elegant to behold, and delightfully easy to use.

FIG. 1 illustrates an example of a smart home environment within which one or more of the devices, methods, systems, services, and/or computer program products described further herein can be applicable. The depicted smart home environment includes a structure 150, which can include, e.g., a house, office building, garage, or mobile home. It will be appreciated that devices can also be integrated into a smart home environment that does not include an entire structure 150, such as an apartment, condominium, or office space. Further, the smart home environment can control and/or be coupled to devices outside of the actual structure 150. Indeed, several devices in the smart home environment need not physically be within the structure 150 at all. For example, a device controlling a pool heater or irrigation system can be located outside of the structure 150.

The depicted structure 150 includes a plurality of rooms 152, separated at least partly from each other via walls 154. The walls 154 can include interior walls or exterior walls. Each room can further include a floor 156 and a ceiling 158. Devices can be mounted on, integrated with and/or supported by a wall 154, floor or ceiling.

The smart home depicted in FIG. 1 includes a plurality of devices, including intelligent, multi-sensing, network-connected devices that can integrate seamlessly with each other and/or with cloud-based server systems to provide any of a variety of useful smart home objectives. One, more or each of the devices illustrated in the smart home environment and/or in the figure can include one or more sensors, a user interface, a power supply, a communications component, a modularity unit and intelligent software as described herein. Examples of devices are shown in FIG. 1.

An intelligent, multi-sensing, network-connected thermostat 102 can detect ambient climate characteristics (e.g., temperature and/or humidity) and control a heating, ventilation and air-conditioning (HVAC) system 103. One or more intelligent, network-connected, multi-sensing hazard detection units 104 can detect the presence of a hazardous substance and/or a hazardous condition in the home environment (e.g., smoke, fire, or carbon monoxide). One or more intelligent, multi-sensing, network-connected entryway interface devices 106, which can be termed a "smart doorbell", can detect a person's approach to or departure from a location, control audible functionality, announce a person's approach or departure via audio or visual means, or control settings on a security system (e.g., to activate or deactivate the security system).

Each of a plurality of intelligent, multi-sensing, network-connected wall light switches 108 can detect ambient lighting conditions, detect room-occupancy states and control a power and/or dim state of one or more lights. In some instances, light switches 108 can further or alternatively control a power state or speed of a fan, such as a ceiling fan. Each of a plurality of intelligent, multi-sensing, network-connected wall plug interfaces 110 can detect occupancy of a room or enclosure and control supply of power to one or more wall plugs (e.g., such that power is not supplied to the plug if nobody is at home). The smart home may further include a plurality of intelligent, multi-sensing, network-connected appliances 112, such as refrigerators, stoves and/or ovens, televisions, washers, dryers, lights (inside and/or outside the structure 150), stereos, intercom systems, garage-door openers, floor fans, ceiling fans, whole-house fans, wall air conditioners, pool heaters 114, irrigation systems 116, security systems (including security system components such as cameras, motion detectors and window/door sensors), and so forth. While descriptions of FIG. 1 can identify specific sensors and functionalities associated with specific devices, it will be appreciated that any of a variety of sensors and functionalities (such as those described throughout the specification) can be integrated into the device.

In addition to containing processing and sensing capabilities, each of the devices 102, 104, 106, 108, 110, 112, 114 and 116 can be capable of data communications and information sharing with any other of the devices 102, 104, 106, 108, 110, 112, 114 and 116, as well as to any cloud server or any other device that is network-connected anywhere in the world. The devices can send and receive communications via any of a variety of custom or standard wireless protocols (Wi-Fi, ZigBee, 6LoWPAN, etc.) and/or any of a variety of custom or standard wired protocols (CAT6 Ethernet, HomePlug, etc.). The wall plug interfaces 110 can serve as wireless or wired repeaters, and/or can function as bridges between (i) devices plugged into AC outlets and communicating using Homeplug or other power line protocol, and (ii) devices that not plugged into AC outlets.

For example, a first device can communicate with a second device via a wireless router 160. A device can further communicate with remote devices via a connection to a network, such as the Internet 162. Through the Internet 162, the device can communicate with a central server or a cloud-computing system 164. The central server or cloud-computing system 164 can be associated with a manufacturer, support entity or service provider associated with the device. For one embodiment, a user may be able to contact customer support using a device itself rather than needing to use other communication means such as a telephone or Internet-connected computer. Further, software updates can be automatically sent from the central server or cloud-computing system 164 to devices (e.g., when available, when purchased, or at routine intervals).

By virtue of network connectivity, one or more of the smart-home devices of FIG. 1 can further allow a user to interact with the device even if the user is not proximate to the device. For example, a user can communicate with a device using a computer (e.g., a desktop computer, laptop computer, or tablet) or other portable electronic device (e.g., a smartphone). A webpage or app can be configured to receive communications from the user and control the device based on the communications and/or to present information about the device's operation to the user. For example, the user can view a current setpoint temperature for a device and adjust it using a computer. The user can be in the structure during this remote communication or outside the structure.

The smart home also can include a variety of non-communicating legacy appliances 140, such as old conventional washer/dryers, refrigerators, and the like which can be controlled, albeit coarsely (ON/OFF), by virtue of the wall plug interfaces 110. The smart home can further include a variety of partially communicating legacy appliances 142, such as IR-controlled wall air conditioners or other IR-controlled devices, which can be controlled by IR signals provided by the hazard detection units 104 or the light switches 108.

Figure 2:
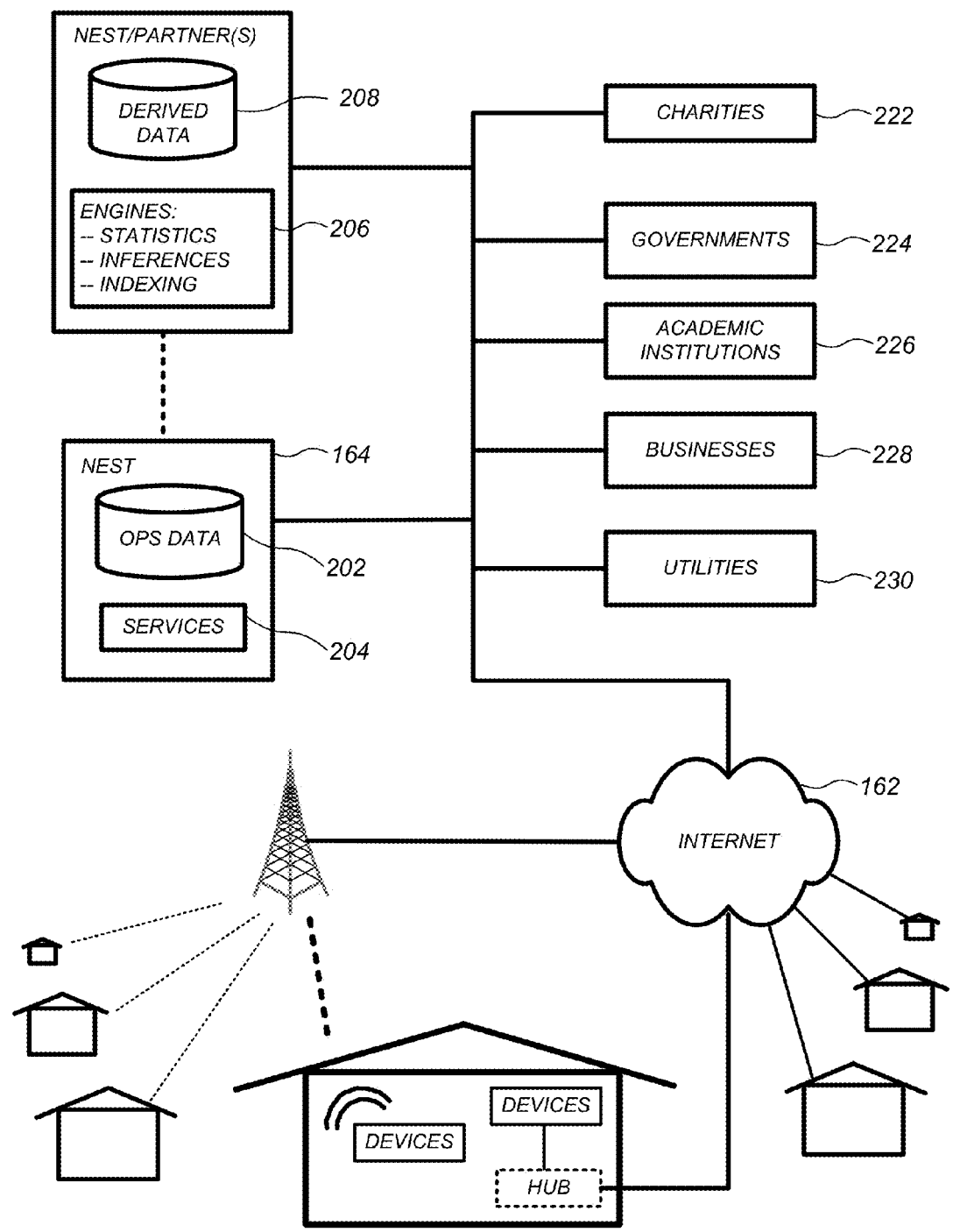
FIG. 2 illustrates a network-level view of an extensible devices and services platform with which the smart home of FIG. 1 can be integrated, according to some embodiments.

FIG. 2 illustrates a network-level view of an extensible devices and services platform with which the smart home of FIG. 1 can be integrated, according to some embodiments. Each of the intelligent, network-connected devices from FIG. 1 can communicate with one or more remote central servers or cloud computing systems 164. The communication can be enabled by establishing connection to the Internet 162 either directly (for example, using 3G/4G connectivity to a wireless carrier), though a hubbed network (which can be scheme ranging from a simple wireless router, for example, up to and including an intelligent, dedicated whole-home control node), or through any combination thereof.

The central server or cloud-computing system 164 can collect operation data 202 from the smart home devices. For example, the devices can routinely transmit operation data or can transmit operation data in specific instances (e.g., when requesting customer support). The central server or cloud-computing architecture 164 can further provide one or more services 204. The services 204 can include, e.g., software update, customer support, sensor data collection/logging, remote access, remote or distributed control, or use suggestions (e.g., based on collected operation data 204 to improve performance, reduce utility cost, etc.). Data associated with the services 204 can be stored at the central server or cloud-computing system 164 and the central server or cloud-computing system 164 can retrieve and transmit the data at an appropriate time (e.g., at regular intervals, upon receiving request from a user, etc.).

One salient feature of the described extensible devices and services platform, as illustrated in FIG. 2, is a processing engines 206, which can be concentrated at a single server or distributed among several different computing entities without limitation. Processing engines 206 can include engines configured to receive data from a set of devices (e.g., via the Internet or a hubbed network), to index the data, to analyze the data and/or to generate statistics based on the analysis or as part of the analysis. The analyzed data can be stored as derived data 208. Results of the analysis or statistics can thereafter be transmitted back to a device providing ops data used to derive the results, to other devices, to a server providing a webpage to a user of the device, or to other non-device entities. For example, use statistics, use statistics relative to use of other devices, use patterns, and/or statistics summarizing sensor readings can be transmitted. The results or statistics can be provided via the Internet 162. In this manner, processing engines 206 can be configured and programmed to derive a variety of useful information from the operational data obtained from the smart home. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engines 206 can generate statistics about device usage across a population of devices and send the statistics to device users, service providers or other entities (e.g., that have requested or may have provided monetary compensation for the statistics). As specific illustrations, statistics can be transmitted to charities 222, governmental entities 224 (e.g., the Food and Drug Administration or the Environmental Protection Agency), academic institutions 226 (e.g., university researchers), businesses 228 (e.g., providing device warranties or service to related equipment), or utility companies 230. These entities can use the data to form programs to reduce energy usage, to preemptively service faulty equipment, to prepare for high service demands, to track past service performance, etc., or to perform any of a variety of beneficial functions or tasks now known or hereinafter developed.

Figure 3:
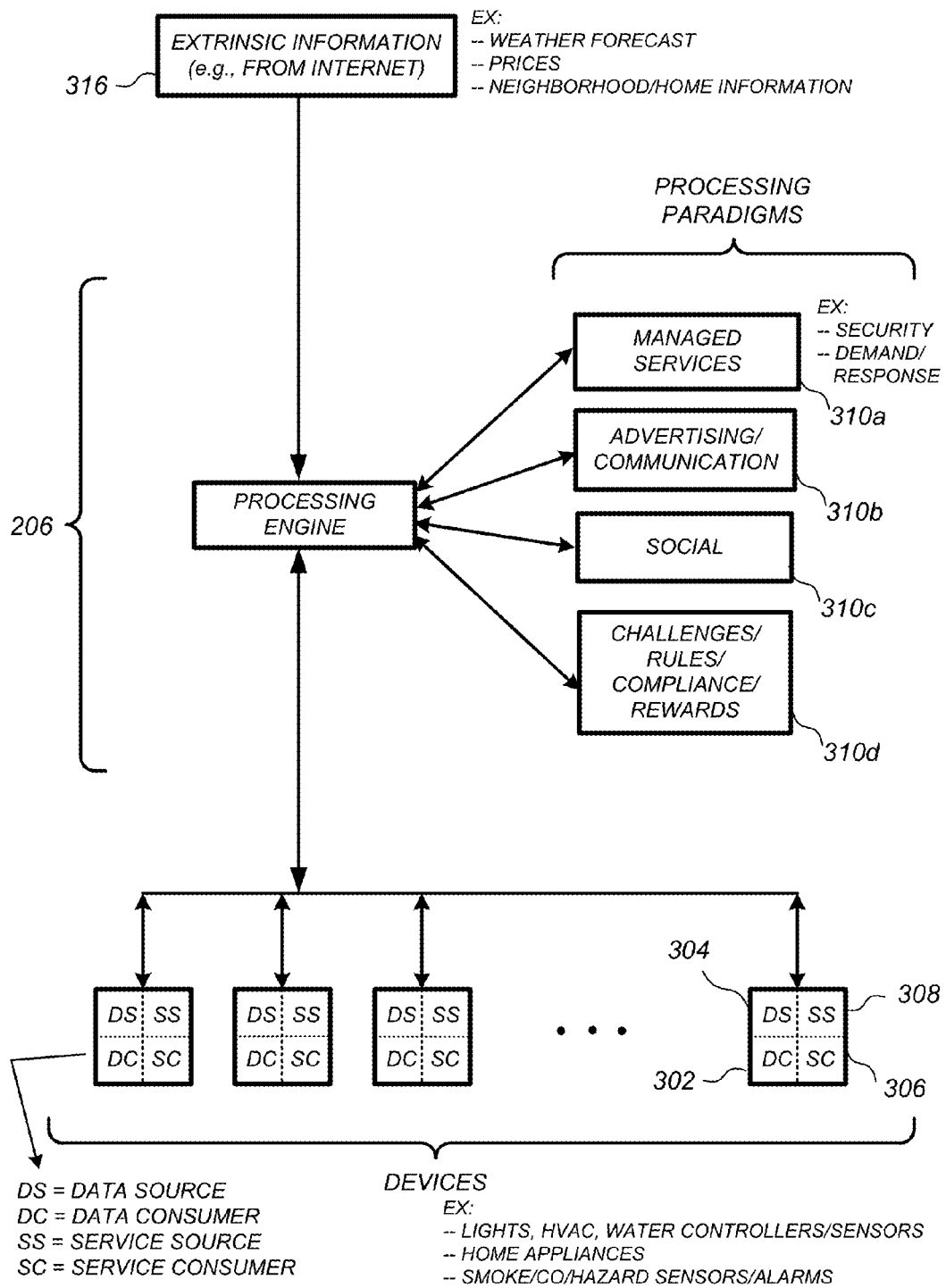
FIG. 3 illustrates an abstracted functional view of the extensible devices and services platform of FIG. 2, according to some embodiments.

FIG. 3 illustrates an abstracted functional view of the extensible devices and services platform of FIG. 2, with particular reference to the processing engine 206 as well as the devices of the smart home. Even though the devices situated in the smart home will have an endless variety of different individual capabilities and limitations, they can all be thought of as sharing common characteristics in that each of them is a data consumer 302 (DC), a data source 304 (DS), a services consumer 306 (SC), and a services source 308 (SS). Advantageously, in addition to providing the essential control information needed for the devices to achieve their local and immediate objectives, the extensible devices and services platform can also be configured to harness the large amount of data that is flowing out of these devices. In addition to enhancing or optimizing the actual operation of the devices themselves with respect to their immediate functions, the extensible devices and services platform can also be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 3 shows processing engine 206 as including a number of paradigms 310. Processing engine 206 can include a managed services paradigm 310a that monitors and manages primary or secondary device functions. The device functions can include ensuring proper operation of a device given user inputs, estimating that (e.g., and responding to) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 206 can further include an advertising/communication paradigm 310b that estimates characteristics (e.g., demographic information), desires and/or products of interest of a user based on device usage. Services, promotions, products or upgrades can then be offered or automatically provided to the user. Processing engine 206 can further include a social paradigm 310c that uses information from a social network, provides information to a social network (for example, based on device usage), processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. Processing engine 206 can include a challenges/rules/compliance/rewards paradigm 310d that informs a user of challenges, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc.

Processing engine can integrate or otherwise utilize extrinsic information 316 from extrinsic sources to improve the functioning of one or more processing paradigms. Extrinsic information 316 can be used to interpret operational data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform, ranging from the ordinary to the profound. Thus, in one "ordinary" example, each bedroom of the smart home can be provided with a smoke/fire/CO alarm that includes an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform, there can be substantially more "profound" examples that can truly illustrate the potential of a larger "intelligence" that can be made available.

By way of perhaps a more "profound" example, the same data bedroom occupancy data that is being used for fire safety can also be "repurposed" by the processing engine 206 in the context of a social paradigm of neighborhood child development and education. Thus, for example, the same bedroom occupancy and motion data discussed in the "ordinary" example can be collected and made available for processing (properly anonymized) in which the sleep patterns of schoolchildren in a particular ZIP code can be identified and tracked. Localized variations in the sleeping patterns of the schoolchildren may be identified and correlated, for example, to different nutrition programs in local schools.

Figure 4A:
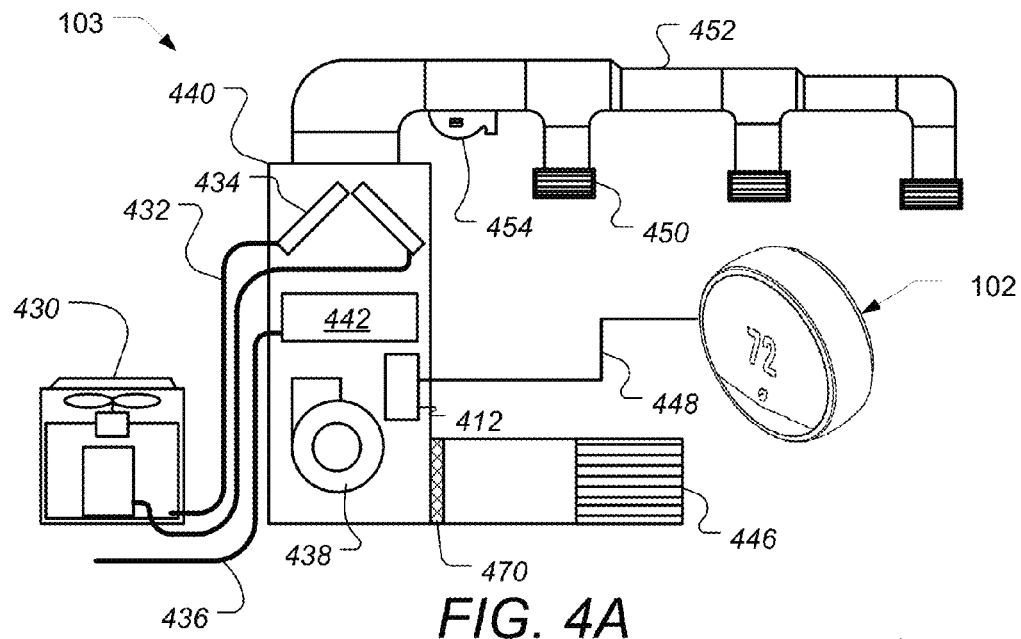
FIG. 4A is a schematic diagram of an HVAC system connected directly to a thermostat, according to some embodiments.

FIG. 4A is a schematic diagram of an HVAC system connected directly to a thermostat 102, according to some embodiments. HVAC system 103 provides heating, cooling, ventilation, and/or air handling for an enclosure, such as structure 150 depicted in FIG. 1. System 103 depicts a forced air type heating and cooling system, although according to other embodiments, other types of HVAC systems could be used such as radiant heat based systems, heat-pump based systems, and others.

For carrying out the heating function, heating coils or elements 442 within air handler 440 provide a source of heat using electricity or gas via line 436. Cool air is drawn from the enclosure via return air duct 446 through filter 470, using fan 438 and is heated through heating coils or elements 442. The heated air flows back into the enclosure at one or more locations via supply air duct system 452 and supply air registers such as register 450. In cooling, an outside compressor 430 passes a refrigerant gas through a set of heat exchanger coils and then through an expansion valve. The gas then goes through line 432 to the cooling coils or evaporator coils 434 in the air handler 440 where it expands, cools and cools the air being circulated via fan 438. A humidifier 454 may optionally be included in various embodiments that returns moisture to the air before it passes through duct system 452. Although not shown in FIG. 4A, alternate embodiments of HVAC system 103 may have other functionality such as venting air to and from the outside, one or more dampers to control airflow within the duct system 452 and an emergency heating unit. Overall operation of HVAC system 103 is selectively actuated by control electronics 412 communicating directly with thermostat 102 using a number of wires 448. The number of control wires depends on what types of components are included HVAC system 103, ranging from 2 wires for a basic single stage heating HVAC system to up to 8 or 10 wires 448 in the case of more complex systems.

Figure 4B:
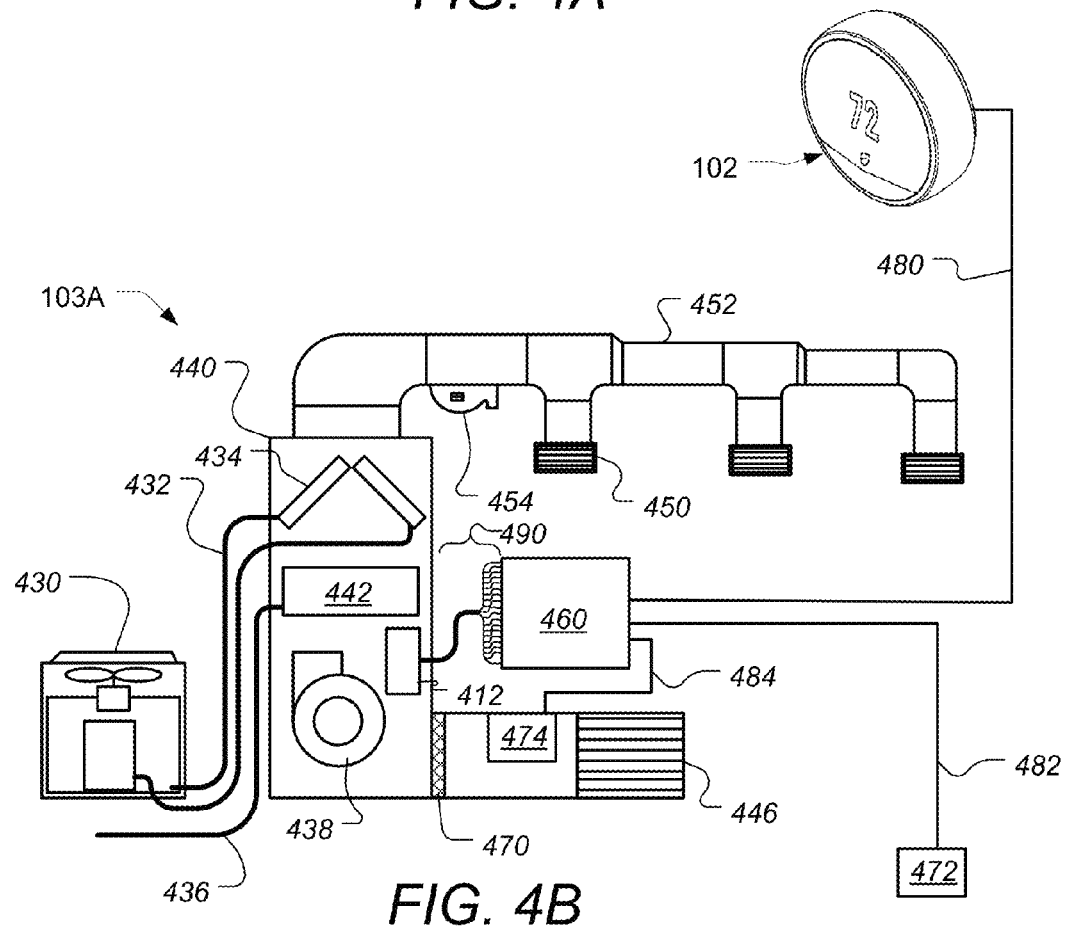
FIG. 4B is a schematic diagram of an HVAC system being controlled by a thermostat through an auxiliary HVAC control unit, according to some embodiments.

FIG. 4B is a schematic diagram of an HVAC system 103A being controlled by thermostat 102 through an auxiliary HVAC control unit, according to some embodiments. In this case the thermostat 102 is connected to the auxiliary HVAC control unit (AHCU) 460 via a small number of (for example 3 or 4) wires 480 and the AHCU 460 is connected to the HVAC system using a larger number of wires (for example up to 16) 490, to HVAC system 103A via the HVAC control electronics 412. Note that the HVAC system 103A can be identical or similar to HVAC system 103, or it could be considerably more complex, making use of many more wires for controlling. According to some embodiments, AHCU 460 can accept up to 22 wires 490 for connection to HVAC system 103A. Examples of wires 490 between the AHCU and HVAC system 103A include the following: "Rh" (Power 24VAC); "Rc" (Power 24VAC); "C" (Power 24VAC, Typically Earth GND); "W1" (First Stage Heat, Return to Rh); "6" (Heating Zones 1-3, power to close valve, Return to Rh); "W2" (Second Stage Heat, Return to Rh); "W3/AUX/E" (Third Stage Heat, Return to Rh); "G" (Fan, Return to Rh); "Y1" (First Stage Cooling, or Heat Pump Enable, Return to Rc); "Y2" (Second Stage Cooling, Return to Rc); "O/B" (Heat Pump Direction, Return to Rc); "HUM1" (Humidifier, Returns to HUM2 or to Rc/Rh); "HUM2" (Second Stage Humidifier, or return for HUM1); "HUM3" (Second Stage Humidifier, or return for HUM1 and/or HUM2); "DEH1" (Dehumidifier, Returns to DEH2 or to Rc/Rh); "DEH2" (Second Stage Dehumidifier, or return for DEH1); "DEH2" (Second Stage Dehumidifier, or return for DEH1 and/or DEH2) "L" (Fault Lamp, for signaling an HVAC fault back to the thermostat); and "V" (Variable speed fan). According to some embodiments the AHCU can also be used to communicate with a number of additional sensors, such as outdoor temperature sensor 472 connected via wire 482 and return air temperature sensor 474 via wire 484, located in return air duct 446. Note that the AHCU 460 is installed very close to the HVAC system. For example, it can be either affixed to the air mover and/or furnace or mounted onto a nearby wall. By locating the AHCU directly on or very close to the HVAC system furnace or air mover, and communicating and supplying power to the thermostat 102 using only a few wires (e.g. 3 or 4 wires 480), a sleek relatively small thermostat that is visually pleasing when wall mounted in a home even with an HVAC system that benefits from a large number of wire connections.

Thus, as shown in FIGS. 4A and 4B, according to some embodiments, the same thermostat unit 102 is capable of connecting either directly to an HVAC system in as in FIG. 4A, through an AHCU, as in FIG. 4B. According to some embodiments, the thermostat 102 is capable of automatically detecting whether it is connected directly to an HVAC system or through an AHCU. When connection to an AHCU is detected, the connected wires are "repurposed" to receive power from and communicate with the AHCU.

Figure 5A:
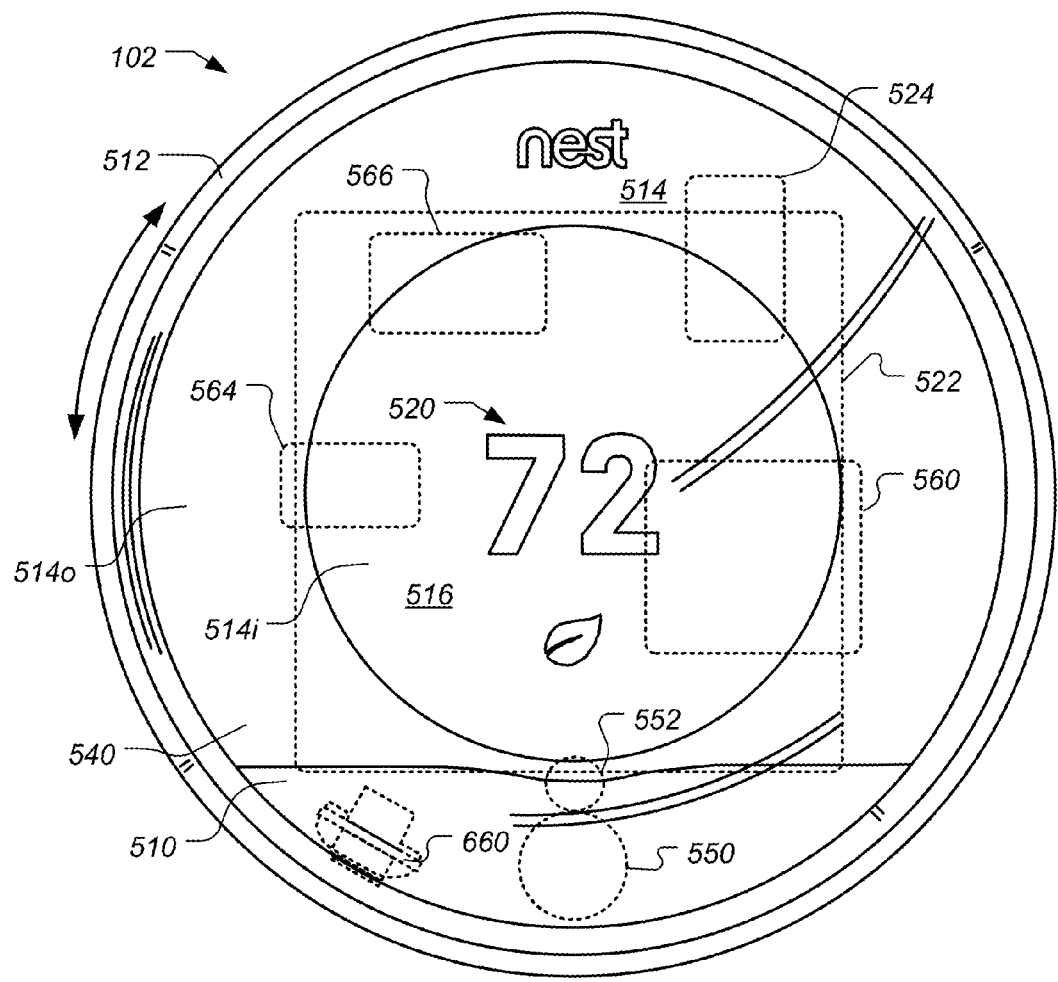
FIGS. 5A-5E illustrate a thermostat having a visually pleasing, smooth, sleek and rounded exterior appearance while at the same time including one or more sensors for detecting occupancy and/or users, according to some embodiments.
Figure 5B:
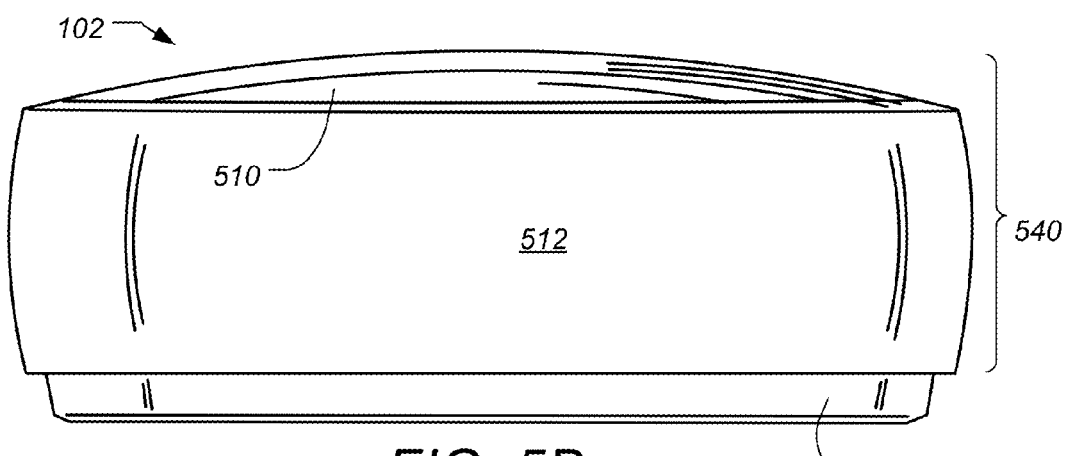
Figure 5C:
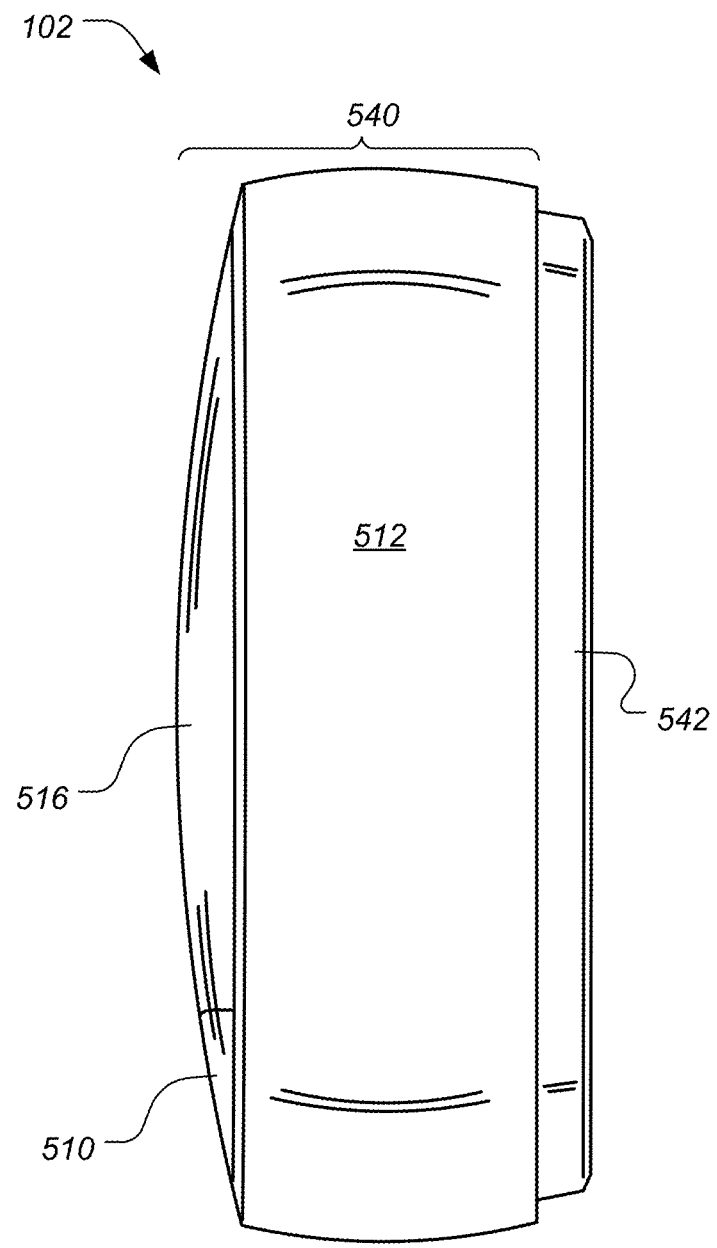
Figure 5D:
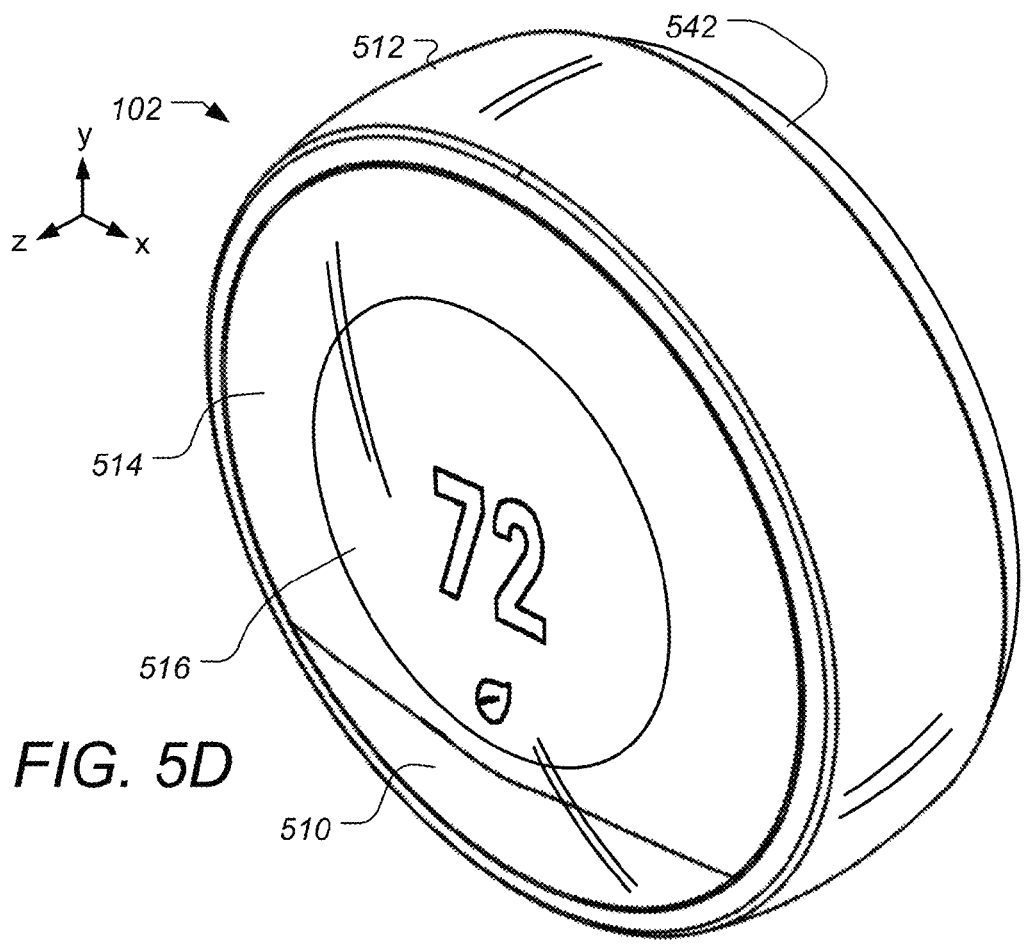

FIGS. 5A-5E illustrate a thermostat having a visually pleasing, smooth, sleek and rounded exterior appearance while at the same time including one or more sensors for detecting occupancy and/or users, according to some embodiments. FIG. 5A is front view, FIG. 5B is a bottom elevation, FIG. 5C is a right side elevation, and FIG. 5D is prospective view of thermostat 102. Unlike many prior art thermostats, thermostat 102 has a sleek, simple, uncluttered and elegant design that does not detract from home decoration, and indeed can serve as a visually pleasing centerpiece for the immediate location in which it is installed. Moreover, user interaction with thermostat 102 is facilitated and greatly enhanced over known conventional thermostats by the design of thermostat 102. The thermostat 102 includes control circuitry and is electrically connected to an HVAC system 103, such as is shown in FIGS. 1-4. Thermostat 102 is wall mountable, is circular in shape, and has an outer rotatable ring 512 for receiving user input. Thermostat 102 is circular in shape in that it appears as a generally disk-like circular object when mounted on the wall. Thermostat 102 has a large convex rounded front face lying inside the outer ring 512. According to some embodiments, thermostat 102 is approximately 80 mm in diameter and protrudes from the wall, when wall mounted, by 32 mm.

The outer rotatable ring 512 allows the user to make adjustments, such as selecting a new setpoint temperature. For example, by rotating the outer ring 512 clockwise, the realtime (i.e. currently active) setpoint temperature can be increased, and by rotating the outer ring 512 counter-clockwise, the realtime setpoint temperature can be decreased. The front face of the thermostat 102 comprises a clear cover 514 that according to some embodiments is polycarbonate, and a Fresnel lens 510 having an outer shape that matches the contours of the curved outer front face of the thermostat 102. According to some embodiments, the Fresnel lens elements are formed on the interior surface of the Fresnel lens piece 510 such that they are not obviously visible by viewing the exterior of the thermostat 102. Behind the Fresnel lens is a passive infrared sensor 550 for detecting occupancy, and the Fresnel lens piece 510 is made from a high-density polyethylene (HDPE) that has an infrared transmission range appropriate for sensitivity to human bodies. As shown in FIGS. 5A-5D, the front edge of rotating ring 512, front face 514 and Fresnel lens 510 are shaped such that they together form a, integrated convex rounded front face that has a common outward arc or spherical shape gently arcing outward.

Although being formed from a single lens-like piece of material such as polycarbonate, the cover 514 has two different regions or portions including an outer portion 514o and a central portion 514i. According to some embodiments, the cover 514 is painted or smoked around the outer portion 514o, but leaves the central portion 514i visibly clear so as to facilitate viewing of an electronic display 516 disposed thereunderneath. According to some embodiments, the curved cover 514 acts as a lens that tends to magnify the information being displayed in electronic display 516 to users. According to some embodiments the central electronic display 516 is a dot-matrix layout (i.e. individually addressable) such that arbitrary shapes can be generated, rather than being a segmented layout. According to some embodiments, a combination of dot-matrix layout and segmented layout is employed. According to some embodiments, central display 516 is a backlit color liquid crystal display (LCD). According to some embodiments another phase-change based display could be used, such as electronic paper or e-ink for central display 516. An example of information displayed on the electronic display 516 is illustrated in FIG. 5A, and includes central numerals 520 that are representative of a current setpoint temperature. The thermostat 102 is preferably constructed such that the electronic display 516 is at a fixed orientation and does not rotate with the outer ring 512, so that the electronic display 516 remains easily read by the user. For some embodiments, the cover 514 and Fresnel lens 510 also remain at a fixed orientation and do not rotate with the outer ring 512. According to one embodiment in which the diameter of the thermostat 102 is about 80 mm, the diameter of the electronic display 516 is about 45 mm. According to some embodiments the gently outwardly curved shape of the front surface of thermostat 102, which is made up of cover 514, Fresnel lens 510 and the front facing portion of ring 512, is spherical, and matches a sphere having a radius of between 100 mm and 150 mm. According to some embodiments, the radius of the spherical shape of the thermostat front is about 136 mm.

Motion sensing with PIR sensor 552 as well as other techniques can be used in the detection and/or predict of occupancy, as is described further in the commonly assigned U.S. patent application Ser. No. 12/881,430, which is incorporated herein by reference. According to some embodiments, occupancy information is used in generating an effective and efficient scheduled program. A second downwardly-tilted PIR sensor 552 is provided to detect an approaching user. The proximity sensor 552 can be used to detect proximity in the range of about one meter so that the thermostat 102 can initiate "waking up" when the user is approaching the thermostat and prior to the user touching the thermostat. Such use of proximity sensing is useful for enhancing the user experience by being "ready" for interaction as soon as, or very soon after the user is ready to interact with the thermostat. Further, the wake-up-on-proximity functionality also allows for energy savings within the thermostat by "sleeping" when no user interaction is taking place our about to take place.

According to some embodiments, for the combined purposes of inspiring user confidence and further promoting visual and functional elegance, the thermostat 102 is controlled by only two types of user input, the first being a rotation of the outer ring 512 as shown in FIG. 5A (referenced hereafter as a "rotate ring" or "ring rotation" input), and the second being an inward push on head unit 540 until an audible and/or tactile "click" occurs (referenced hereafter as an "inward click" or simply "click" input). For such embodiments, the head unit 540 is an assembly that includes all of the outer ring 512, cover 514, electronic display 516, and the Fresnel lens 510. When pressed inwardly by the user, the head unit 540 travels inwardly by a small amount, such as 0.5 mm, against an interior metallic dome switch (not shown), and then springably travels back outwardly by that same amount when the inward pressure is released, providing a satisfying tactile "click" sensation to the user's hand, along with a corresponding gentle audible clicking sound. According to some embodiments, the clicking sound is generated by a small speaker located within the thermostat 102. Thus, for the embodiment of FIGS. 5A-5D, an inward click can be achieved by direct pressing on the outer ring 512 itself, or by indirect pressing of the outer ring by virtue of providing inward pressure on the cover 514, lens 510, or by various combinations thereof. For other embodiments, the thermostat 102 can be mechanically configured such that only the outer ring 512 travels inwardly for the inward click input, while the cover 514 and lens 510 remain motionless. It is to be appreciated that a variety of different selections and combinations of the particular mechanical elements that will travel inwardly to achieve the "inward click" input are within the scope of the present teachings, whether it be the outer ring 512 itself, some part of the cover 514, or some combination thereof. However, it has been found particularly advantageous to provide the user with an ability to quickly go back and forth between registering "ring rotations" and "inward clicks" with a single hand and with minimal amount of time and effort involved, and so the ability to provide an inward click directly by pressing the outer ring 512 has been found particularly advantageous, since the user's fingers do not need to be lifted out of contact with the device, or slid along its surface, in order to go between ring rotations and inward clicks. Moreover, by virtue of the strategic placement of the electronic display 516 centrally inside the rotatable ring 512, a further advantage is provided in that the user can naturally focus their attention on the electronic display throughout the input process, right in the middle of where their hand is performing its functions. The combination of intuitive outer ring rotation, especially as applied to (but not limited to) the changing of a thermostat's setpoint temperature, conveniently folded together with the satisfying physical sensation of inward clicking, together with accommodating natural focus on the electronic display in the central midst of their fingers' activity, adds significantly to an intuitive, seamless, and downright fun user experience. Further descriptions of advantageous mechanical user-interfaces and related designs, which are employed according to some embodiments, can be found in U.S. Ser. Nos. 13/033,573, 29/386,021, and 13/199,108, all of which are incorporated herein by reference.

FIGS. 5B and 5C are bottom and right side elevation views of the thermostat 102, which has been found to provide a particularly pleasing and adaptable visual appearance when viewed against a variety of different wall colors and wall textures in a variety of different home environments and home settings. While the thermostat itself will functionally adapt to the user's schedule as described herein and in one or more of the commonly assigned incorporated applications, the outer shape is specially configured to convey a "chameleon" quality or characteristic such that the overall device appears to naturally blend in, in a visual and decorative sense, with many of the most common wall colors and wall textures found in home and business environments, at least in part because it will appear to assume the surrounding colors and even textures when viewed from many different angles.

According to some embodiments, the thermostat 102 includes a processing system 560, display driver 564 and a wireless communications system 566. The processing system 560 is adapted to cause the display driver 564 and display 516 to display information to the user, and to receiver user input via the rotatable ring 512. The processing system 560, according to some embodiments, is capable of carrying out the governance of the operation of thermostat 102 including various user interface features. The processing system 560 is further programmed and configured to carry out other operations as described further hereinbelow and/or in other ones of the commonly assigned incorporated applications. For example, processing system 560 is further programmed and configured to maintain and update a thermodynamic model for the enclosure in which the HVAC system is installed, such as described in U.S. Ser. No. 12/881,463, and in International Patent App. No. PCT/US11/51579, both of which are incorporated herein by reference. According to some embodiments, the wireless communications system 566 is used to communicate with devices such as personal computers and/or other thermostats or HVAC system components, which can be peer-to-peer communications, communications through one or more servers located on a private network, or and/or communications through a cloud-based service.

Figure 5E:
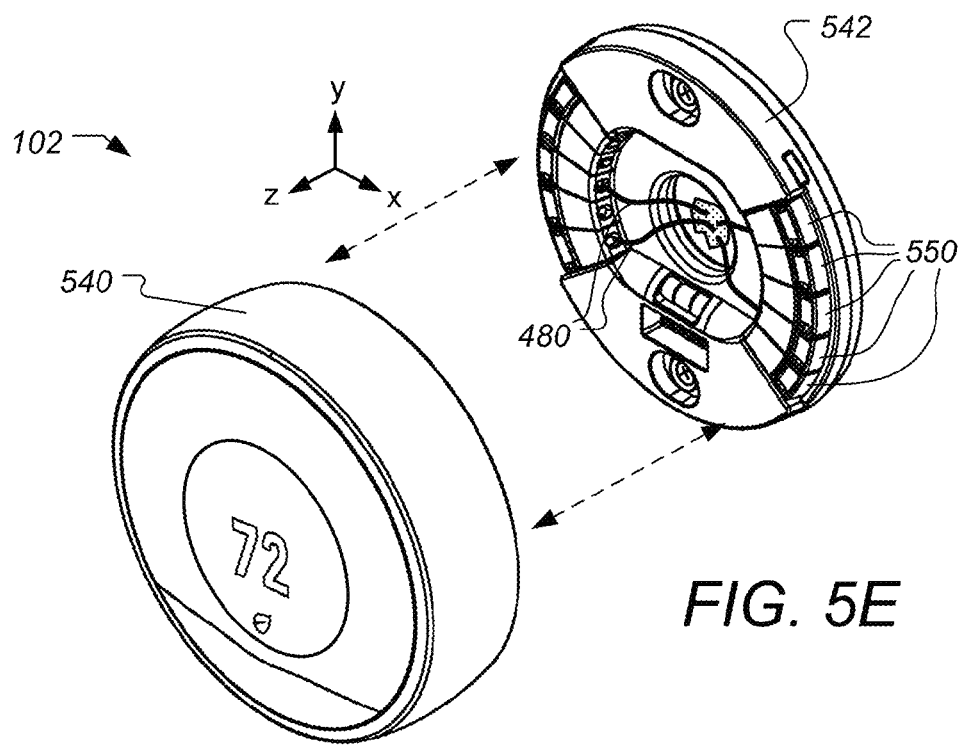

According to some embodiments, for ease of installation, configuration and/or upgrading, especially by a non-expert installer such as a user, the thermostat 102 includes a head unit 540 and a backplate (or wall dock) 542. As is described hereinabove, thermostat 102 is wall mounted and has circular in shape and has an outer rotatable ring 512 for receiving user input. Head unit 540 of thermostat 102 is slidably mountable onto back plate 542 and slidably detachable therefrom, as shown in FIG. 5E, which depicts the backplate 542 mounted on a wall with the headunit 540 removed. According to some embodiments the connection of the head unit 540 to backplate 542 can be accomplished using magnets, bayonet, latches and catches, tabs or ribs with matching indentations, or simply friction on mating portions of the head unit 540 and backplate 542. According to some embodiments, the head unit 540 includes a processing system 560, display driver 564 and a wireless communications system 566. Also shown is a rechargeable battery 522 that is recharged using recharging circuitry 524 that uses power from backplate that is either obtained via power harvesting (also referred to as power stealing and/or power sharing) from the HVAC system control circuit(s) or from a common wire, if available, as described in further detail in co-pending patent application U.S. Ser. Nos. 13/034,674, and 13/034,678, which are incorporated by reference herein. According to some embodiments, rechargeable battery 522 is a single cell lithium-ion, or a lithium-polymer battery.

Also visible in FIG. 5E are plurality of tool-free wiring terminals 550, each adapted and configured to make an electrical connection with an HVAC wire. Each of the wiring terminals 550 are adapted and configured to allow a user to make an electrical connection with an HVAC wire without the use of tools by pressing a button member and inserting an HVAC wire into a wire hole. While there is substantial benefit in providing such tool-free wiring terminals, they generally take up a greater amount of space on backplate 542 than would screw-type wiring terminals. Additionally, as described, infra, the thermostat 102 is about 80 mm in diameter according to some embodiment, and therefore the backplate 541 is less than that dimension. As such there is a substantial benefit to using an AHCU since only a limited number of tool free wiring terminals can be accommodated on such a small backplate. In the case where thermostat 102 is connected to an AHCU instead of directly to the HVAC system wires, the wiring terminals 550 are also used for making connection to the AHCU wires. Since generally only a small number of wires will be used in communicating and receiving power from the AHCU, only a subset of the wiring terminals 550 will be used (note that in the embodiment shown in FIG. 5E, backplate 542 includes 10 wiring terminals arranged in two circular arc-shaped banks) Shown in FIG. 5E are four AHCU wires 480 passing through a hole in the wall and each connected to the wiring terminals 550. According to some embodiments, only three wires are used to connect thermostat 102 to the AHCU 460. In the three-wire case, the wiring terminals for the "C" and "Rc" wires are used to receive power from the AHCU, and wiring terminal for an "O/B" wire is used for serial communication. According to some other embodiments, four wires are used to connect thermostat 102 to the AHCU 460. In a four-wire configuration, an additional communication wire is used which is connected to the "W1" wiring terminal on thermostat 102. Note that in these embodiments, auto detection of connection to an AHCU is very straightforward since direct connection to an HVAC system will never include an O/B wire (heat pump polarity) without an accompanying "Y" wire attached. Thus, if the O/B wire is connected and there is no Y wire connected, the thermostat 102 assumes it is connected to an AHCU rather than directly to an HVAC system. In such cases, the connected wires (i.e. the C, Rc, O/B and possibly the W1 wires) are "repurposed" to receive power (using the C and Rc wires) from and communicate (using either O/B wire alone or both the O/B and W1 wires) with the AHCU. According to some embodiments, other combinations of wire connections can be used to both connect the AHCU 460 to thermostat 102 as well as by the thermostat 102 to automatically detect a connection to an AHCU and automatically repurpose the wires.

Figure 6:
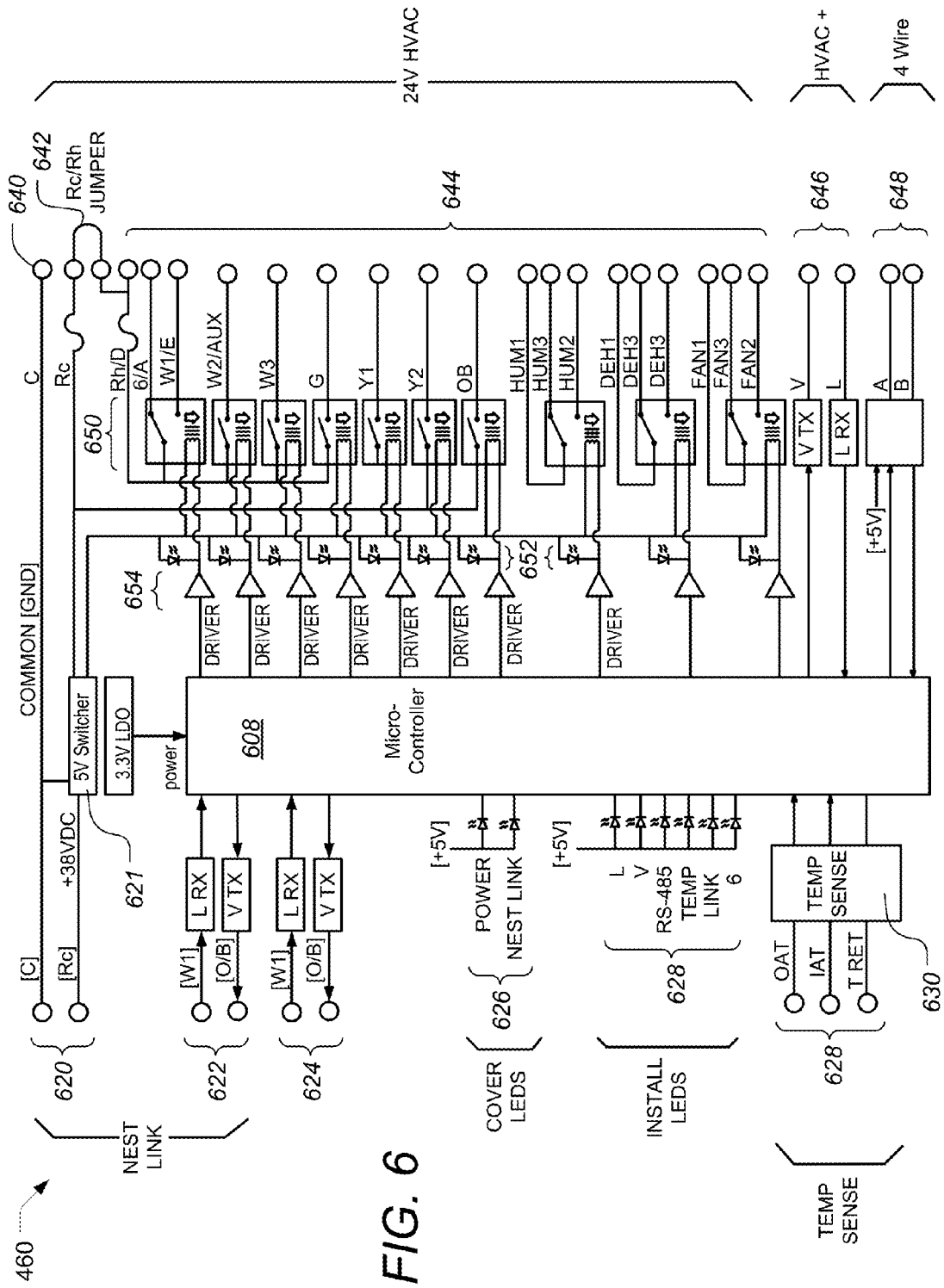
FIG. 6 is a schematic diagram showing electronic circuitry within an AHCU, according to some embodiments.

FIG. 6 is a schematic diagram showing electronic circuitry within an AHCU, according to some embodiments. ACHU 460, is an external accessory that is connected between the thermostat 102 and the HVAC system 103A. The ACHU 460 expands the number of HVAC wire switching circuits, and adds remote temperature sensing, fault reporting as well as support for modulating fan speed. Advantageously, this added functionality can be gained without upgrading or changing the thermostat unit 102. Thus, the ACHU is beneficial in expanding the compatibility of thermostat 102 to a greater variety of HVAC systems.

Additionally, no hardware change is required to the thermostat 102 to utilize the ACHU. All switching functions transfer from the backplate 542 of the thermostat 102 to standard dry-contact relays in 650 on ACHU 460. In this way, compatibility can be expanded since the HVAC system 103A "sees" exactly the same interface (i.e conventional dry-contact relays) as if it were connected to a standard conventional thermostat, and at the same time, the thermostat 102 is isolated from the HVAC signals, and always has power without the use of power stealing.

As described, infra, the ACHU 460 is configured for installation at the HVAC system, either affixed to the air mover/furnace or to a nearby wall (using wall mounting holes, not shown). Since as many as 22 wires can be connected between the ACHU 460 and the HVAC system 103A, positioning between the HVAC system and the ACHU is beneficial. Additional wires can easily be run between the HVAC system and the ACHU due to their close proximity. Additionally, by affixing the ACHU directly to the air mover and/or furnace, or placing it on a nearby wall, the ACHU as well as the many wires running between the ACHU and the HVAC system has little or no negative impact on the home's décor, thereby providing for a visually pleasing installation.

As shown in FIG. 6, connection to the thermostat is via wiring terminals 620 for power, and 622 for communication. According to some embodiments, the thermostat power is supplied in a way that simplifies the data interface. In particular, the 24V AC signal is rectified to DC, (at ~35V), by switcher 621 and passed through a current limiting circuit or resetable fuse (at ~100 mA) for safety (not shown). According to some embodiments, communication with the thermostat 102 uses the O/B wire, referenced from the C wire. According to some embodiments a single dedicated communication is used with a return and can be shared with the power supply wires. The resulting current loop is used for asynchronous, interrupt driven serial communication. In a simple example, the thermostat sends a "give me second stage heat" and AHCU sends message back "confirm second stage heat activated." The communication can be either bi-directional or unidirectional. According to some other embodiments, the W1 wire between the AHCU and the thermostat is used for communication as well as the O/B wire, for a total of four wires used between the thermostat and the AHCU.

According to some embodiments, a second thermostat can be attached to the ACHU using terminals 624 (for communication) and 620 for power. This might be useful, for example, to attach a thermostat temporarily during installation, diagnostics, and/or trouble shooting by connected an additional thermostat locally directly to the ACHU. As will be described in greater detail with respect to FIG. 7, supra, according to some embodiments a graphical representation of the ACHU wiring and operation is presented in which a painted or silkscreened diagram is provided along with a number of LEDs to indicated various functions, operations and connections taking place within the ACHU as a "train map" type diagram. The LEDs 626, 628, 652 and 654 shown in FIG. 6 are for this purpose.

Also provided according to some embodiments is the ability by the AHCU 460 to measure one or more additional temperature readings. Temperature sensors can be connected to terminals 628 which lead to temperature sense circuitry 630 as shown in FIG. 6. According to some embodiments, the temperature sensors can be for an outdoor air temperature (OAT) sensor, an indoor air temperature (IAT) sensor, and/or an return air temperature (T RET) sensor.

Shown in FIG. 6 connection terminals 644 for a number of 24V HVAC wires that are used for connection to the HVAC system 103A. The C wire terminal 640, and the Rc wire terminal 642 (as well as the Rh terminal if a jumper is installed, as shown) are connection directly to the 24VAC. The other terminals 644 include the following: "W1" (First Stage Heat, Return to Rh); "6" (Heating Zones 1-3, power to close valve, Return to Rh); "W2" (Second Stage Heat, Return to Rh); "W3/AUX/E" (Third Stage Heat, Return to Rh); "G" (Fan, Return to Rh); "Y1" (First Stage Cooling, or Heat Pump Enable, Return to Rc); "Y2" (Second Stage Cooling, Return to Rc); "O/B" (Heat Pump Direction, Return to Rc); "HUM1" (Humidifier, Returns to HUM2 or to Rc/Rh); "HUM2" (Second Stage Humidifier, or return for HUM1); "HUM3" (Second Stage Humidifier, or return for HUM1 and/or HUM2); "DEH1" (Dehumidifier, Returns to DEH2 or to Rc/Rh); "DEH2" (Second Stage Dehumidifier, or return for DEH1); "DEH2" (Second Stage Dehumidifier, or return for DEH1 and/or DEH2). Terminals 646 are for an "L" wire (Fault Lamp, for signaling an HVAC fault back to the thermostat); and a "V" wire (Variable speed fan). Terminals 648 are used for an RS-422 interface, which can replace multiple wires and relays in some types of higher-end HVAC systems.

Figure 7:
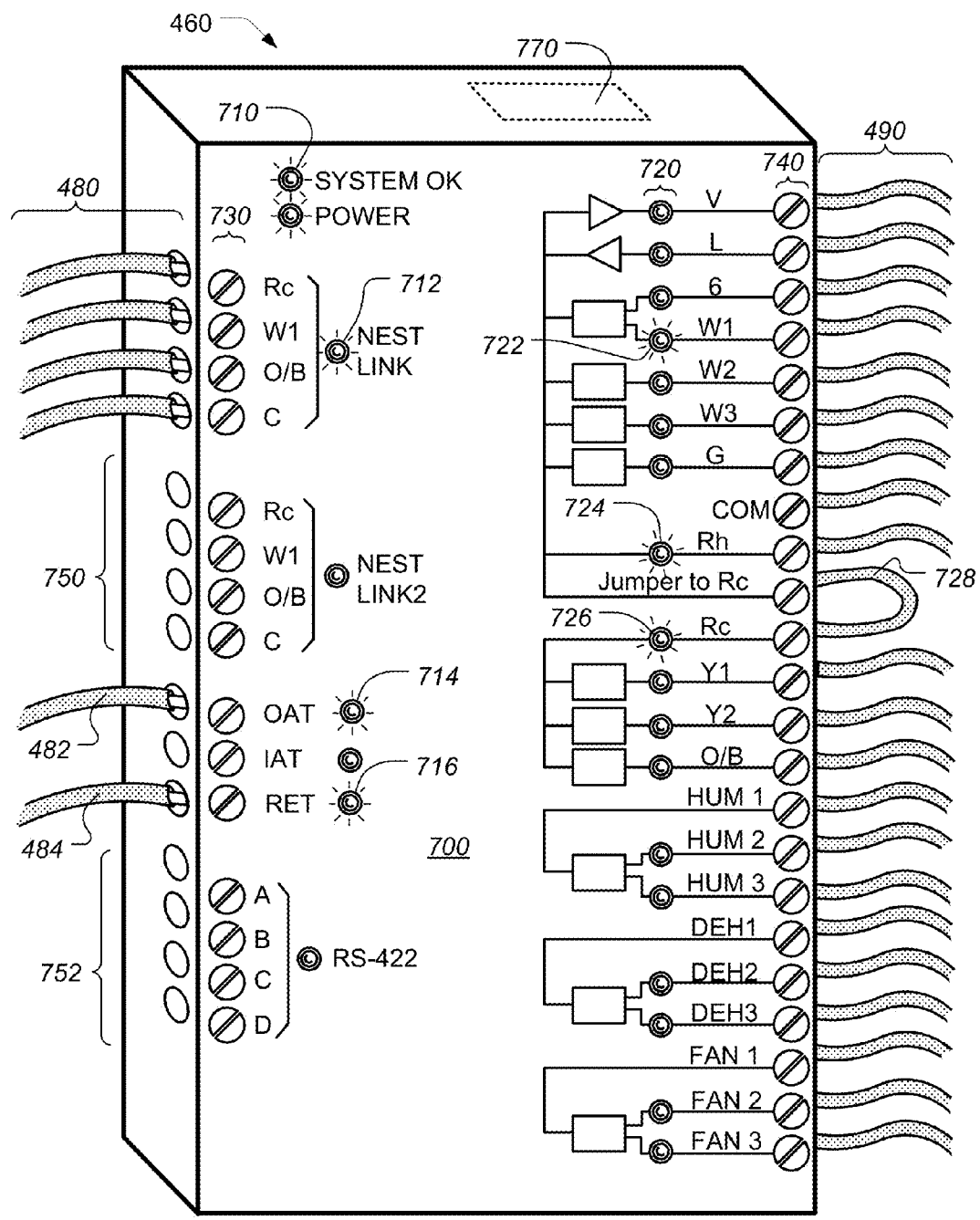
FIG. 7 is a perspective view of an auxiliary HVAC control unit which includes a graphical representation wiring and operation presented as a "train map" type diagram, according to some embodiments.

FIG. 7 is a perspective view of an AHCU which includes a graphical representation wiring and operation presented as a "train map" type diagram, according to some embodiments. The front panel 700 of AHCU 460 is shown in FIG. 7 with the labels, circuit diagrams and symbols silk-screened on the metallic (or other suitable housing material) outer housing of AHCU 460. According to other embodiment a sticker or paint can be used. The AHCU 460 front panel 700 also has a number of LEDs positioned to as to be visible and indicate various information to a person viewing the front panel 700. For example a status LED 710 is shown in a "lit" state indicating the system is OK. Another LED is also lit showing that the AHCU has power, in this case from the inserted C wire (in the COM terminal) and an "Rh wire. AHCU 460 includes a number of screw-anchored terminals 730 and 740 on either side of the housing, which are positioned as shown near the front panel 700 such that the silk-screened labels and circuit lines can clearly associated with each wire inserted in a terminal. In the case shown, four input wires 480 inserted into wire terminals 730 running from the thermostat 102. The LED 712 is lit, indicating that the connection to the thermostat 102 is fully operational. According to some embodiments, the LED 712 also indicate one or more error conditions, such as blinking at a slow or fast rate to indicate different problems. Any of the LEDs on the AHCU 460 can also be configured to show two or more colors (such as green and amber) which can be used to indicate further information to a user (for the thermostat link LED 712, for example, green sold could indicate and OK status, while blinking amber can indicate the wires are connected but there is a problem). As described, infra, according to some embodiments, only three wires can be used, namely the Rc, O/B and C wires. According to yet other embodiments, other numbers of wires can be used between the AHCU and the thermostat, for example greater numbers such as 5-8 wires and fewer wires such as 2 wires can be used. Also shown are inputs 750 for a second thermostat. As described, infra, attaching a thermostat to the second input 750 temporarily right next to the AHCU 460 can be especially useful during installation and/or diagnostic procedures since a person could operate the thermostat and immediately see the resulting operation of the AHCU 460 by viewing the front panel 700. Also shown in this case are two wires 482 and 484 used to connect an outside air temperature sensor and a return temperature sensor as shown in FIG. 4. LEDs 714 and 716 are lit showing that connection with those sensors is OK. A set of additional terminals 752 can be used, according to some embodiments for connection between AHCU and a device using RS-422 standard signaling to send and/or receive data. For example, some HVAC equipment may operate using RS-422 communication. According to some embodiment another cover piece that covers the all of the LEDs except for LED 710 is provided so as to provide a more visually pleasing exterior in some settings.

Along the right side of the AHCU 460 are a number of terminals 740 used to connected directly to an HVAC system. Shown in this example are input terminals for 22 HVAC wires, although according to other embodiments greater or fewer numbers of terminals can be provided. The location of the input terminals is such that a person viewing front panel 700 can easily and intuitively understand the internal connections between the various HVAC wires. For example, in the state shown in FIG. 7, it can easily be understood by viewing the front panel 700 that an active first stage heating call is being made, since the W1 LED 722 and the Rh LED 724 are both lit, and the circuit diagram shows that when those LEDs are lit there is a connection (or a short) between those two wires. Note that in this case a jumper 728 is connected, which shorts the Rc and Rh terminals as indicated on front panel 700, and as a result, LED 726 is also lit in the state shown. Thus, as shown, the "train map" style graphic display on front panel 700 of AHCU provides a graphical indication to the installer or user as to which relays or switches are currently open and which are currently closed by the AHCU 460. It has been found that a graphical display in this this "train map" form is a useful intuitive diagnostic tool for use during installation or other diagnostic procedures on the HVAC system.

According to some embodiments, firmware within the AHCU 460 is upgradeable from the thermostat 102. According to some other embodiments, the AHCU 460 includes a wireless communication module 770, that uses a low power radio communications, for example Zigbee, to communicate with other networked devices.

Figure 8A:
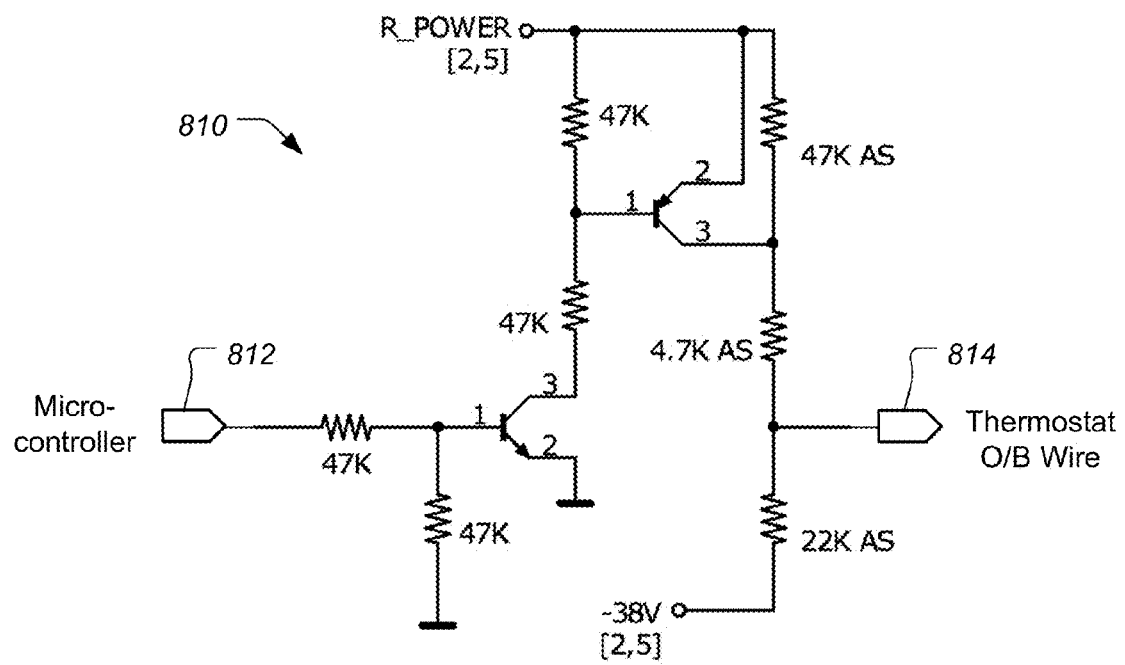
FIGS. 8A-8B are schematic diagrams showing aspects of circuitry in an auxiliary HVAC control unit for receiving and sending messages from and to a thermostat, according to some embodiments.

FIG. 8A is a schematic diagram showing aspects of circuitry in an AHCU for transmitting messages from to thermostat, according to some embodiments. Communication with the thermostat 102 uses the O/B wire, referenced from the C wire. Node 814 is connected to one of the wiring terminal 730 (shown in FIG. 7) to an O/B wire that runs to the O/B terminal of the thermostat 102. Node 812 is connected to the microcontroller 608 (shown in FIG. 6) The circuitry 810 provides a nominal negative pull down that will appear at the microcontroller on the backplate 542 of thermostat 102 as a logical low. A logical high is driven by changing the pull-down to a pull-up by the thermostat 102. Node 812 has an impedance of ~3K when pulled up. The signaling level is compatible with an O/B voltage detection circuit on thermostat 102. When the O/B switch is open in the thermostat 102, node 812 floats at about −10V. When the O/B switch is closed in the thermostat 102, note 814 is pulled to +35V. The −10V offset is used to generate the 0V low at the microcontroller on the back plate of thermostat 102.

Figure 8B:
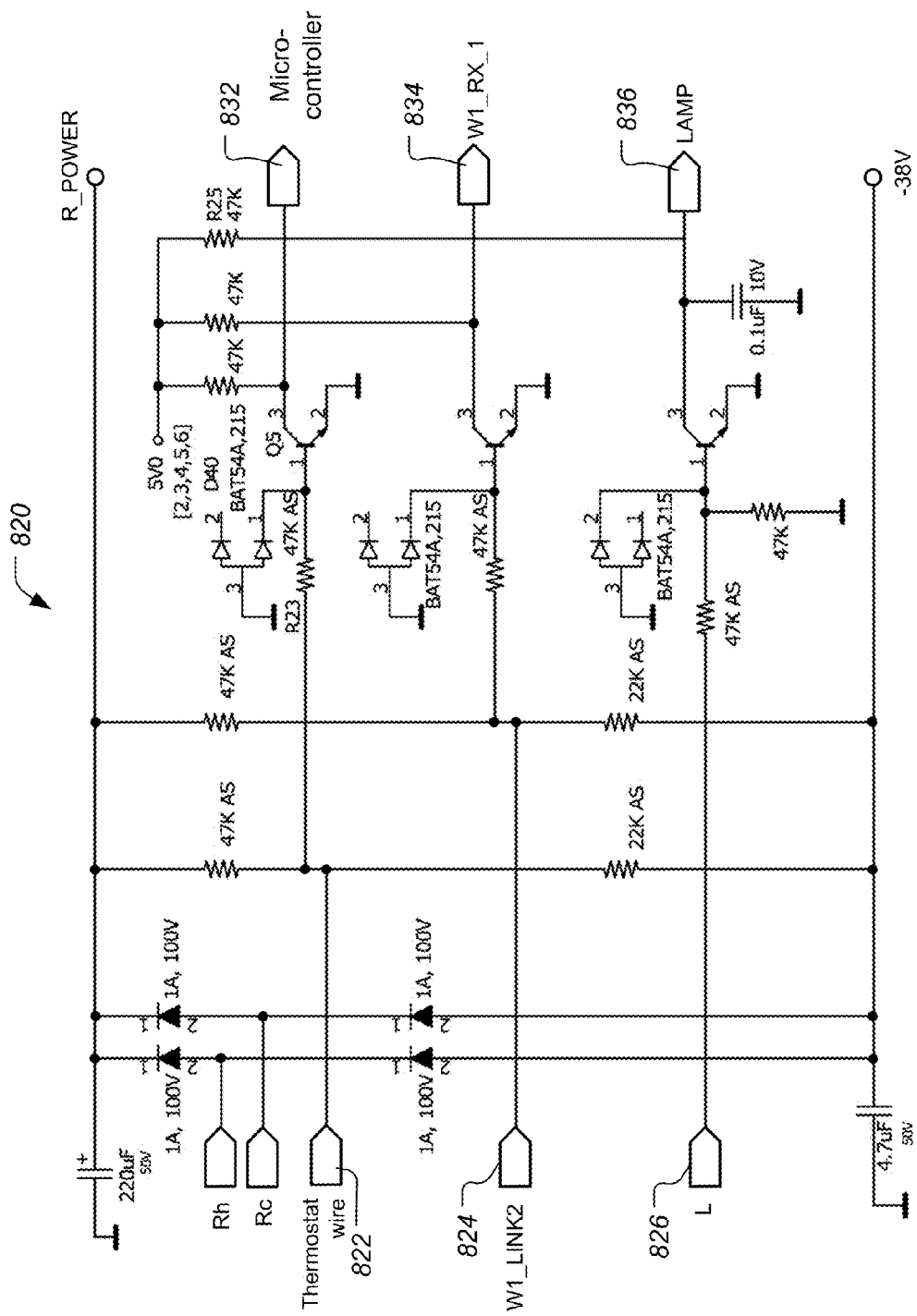

FIG. 8B is a schematic diagram showing aspects of circuitry within an AHCU for receiving messages from a thermostat, according to some embodiments. The thermostat sends a signal to the AHCU by turning on and off the W1 switch at the thermostat, which is connected to node 822 is to the through wiring terminal 730 (shown in FIG. 7), and the signal is passed through node 832 which is connected to the microcontroller 608 (shown in FIG. 6). An L signal is commonly used to indicate that there has been a fault in the HVAC system, (for example an over-current condition at the compressor during a start or a run). AHCU receives a 24V AC signal from the furnace via the L wire terminal (e.g. see terminal 646 on FIG. 6). The AHCU 460 microcontroller 608 (shown in FIG. 6) monitors this signal at high impedance, and reports it back to thermostat 102 via an encoded message via the O/B wire. According to some embodiments, error codes can be decoded by the AHCU 460.

Figure 8C:
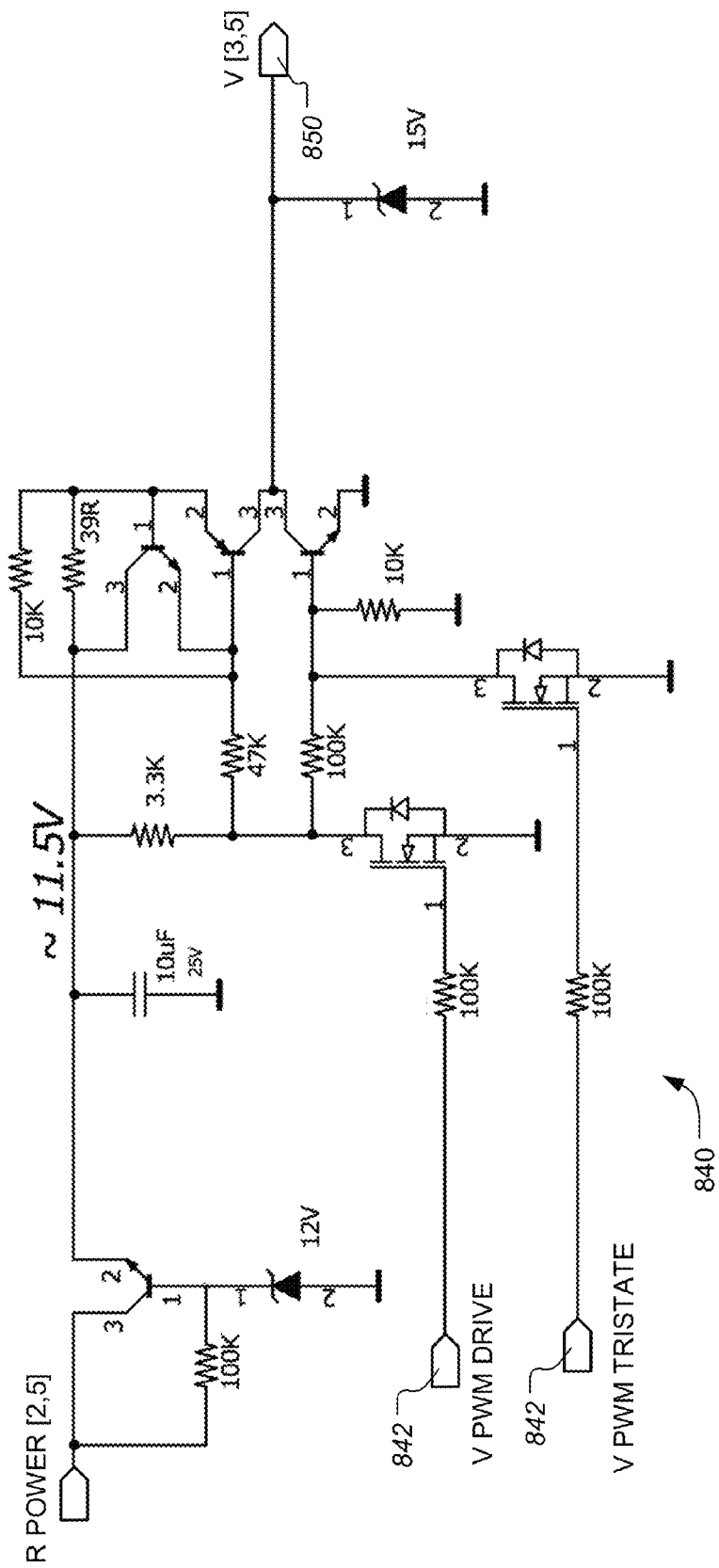
FIG. 8C is a schematic diagram showing aspects of circuitry within an auxiliary HVAC control unit for sending variable fan speed signal to an HVAC system, according to some embodiments.

FIG. 8C is a schematic diagram showing aspects of circuitry within an AHCU for sending variable fan speed signal to an HVAC system, according to some embodiments. The nodes 842 and 844 are driven by the microcontroller 608 on the AHCU (shown in FIG. 6) into circuitry 840 to drive the V wire signal at node 850 which is connected to the V wire of the HVAC system. The V wire signal is a pulse-width-modulated (PWM) signal to the HVAC system for controlling variable fan speed. The period is a nominal 1 second, the voltage is nominal ~10V. The signaling ranges from a minimum of 350 ms on for 40%, to 950 mS on for 100%.

Figure 8D:
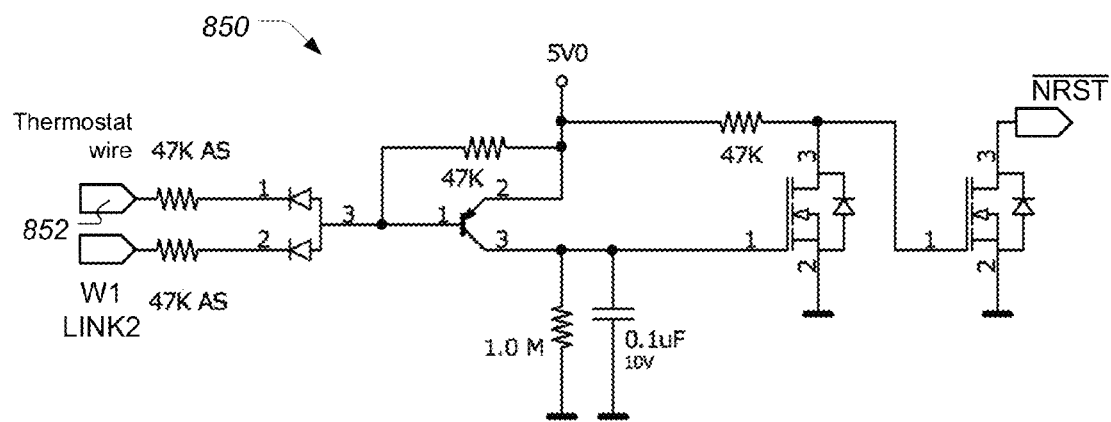
FIG. 8D is a schematic diagram showing aspects of circuitry within an AHCU for detecting a reset signal, according to some embodiments.

FIG. 8D is a schematic diagram showing aspects of circuitry within an AHCU for detecting a reset signal, according to some embodiments. If the wire via node 852 is held closed for longer than a data byte then a reset of the AHCU is generated using circuitry 850. According to some embodiments communication is carried out similarly to RS-232, where fore exampled there is a stop bit every 10 bit times which resets the circuit and prevents a reset form being inadvertently generated by messages of data containing all logical 1's.

Thus, the AHCU 460, as described, is configured to provide power and a communication link to the thermostat 102 using substantially fewer wires than needed for conventionally controlling the HVAC system. Additionally, the circuitry required to generate some types of control signals, such as "V" wire signal, is provided on the AHCU instead of on the thermostat 102 where space is more valuable due to the desirability of a small sleek visually pleasing unit. Furthermore, a "safe" (in terms of not having accidental tripping risk due to the use of power stealing) form of power is supplied to the thermostat without the use of a separate C wire running to the thermostat. This is beneficial, for example, in cases when a common wire is not present and certain types of thermostat relays and/or switches make power stealing impractical. In such cases the use of the AHCU avoids the cost of adding a common wire between the HVAC system and the thermostat.

Other applications in a smart home setting for the described auxiliary unit include: an auxiliary box for controlling an irrigation system (where there can be large numbers of individually controllable irrigation lines), and a home entertainment system (which can include multiple components, speakers, monitors, etc. installed in various locations), as well as other devices that are shown in FIG. 1.

Figure 9:
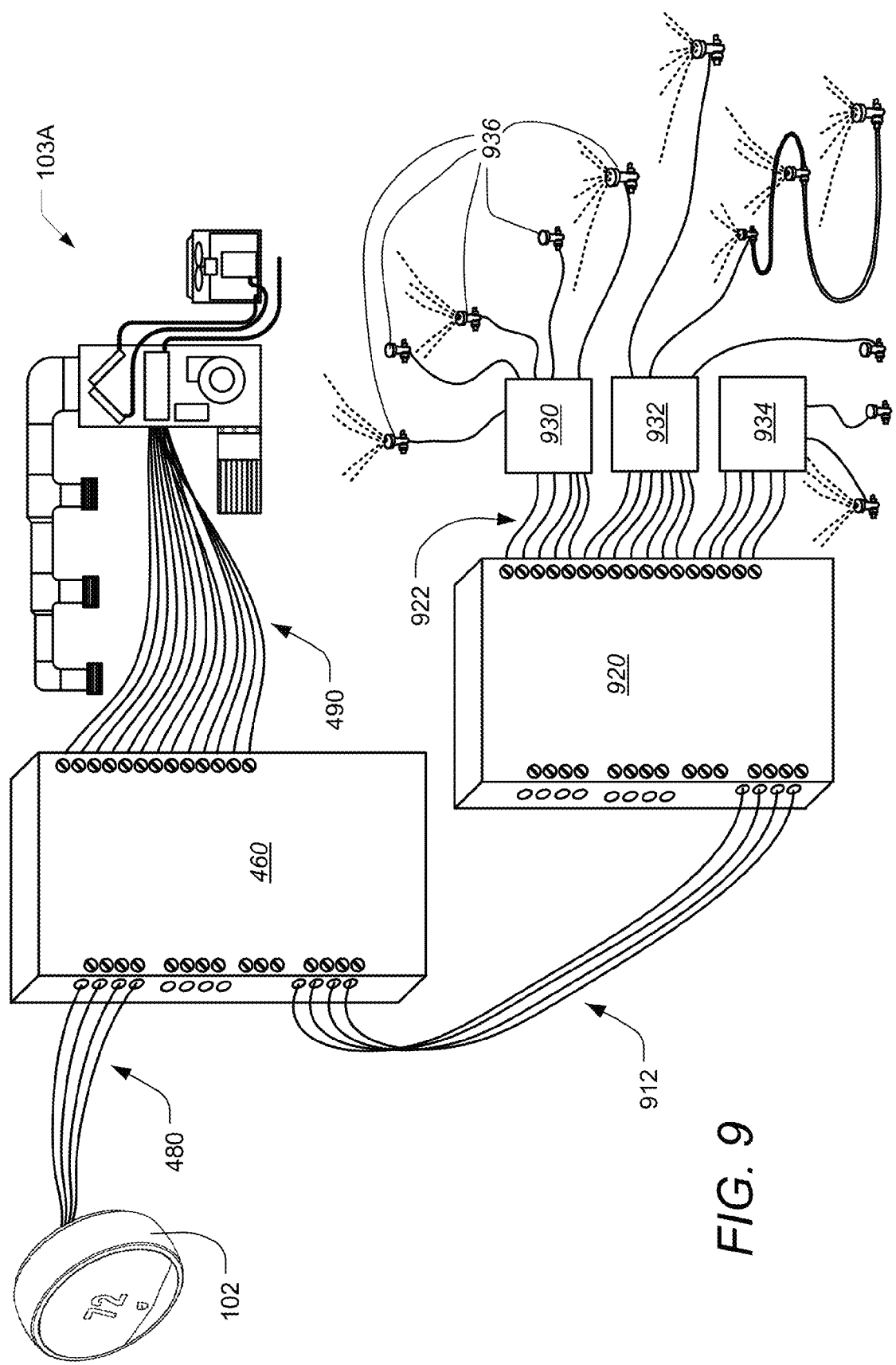
FIG. 9 shows an example of a thermostat connected to a cascaded arrangement of multiple auxiliary control units configured to control different types of smart home equipment, according to some embodiments.

FIG. 9 shows an example of a thermostat connected to a cascaded arrangement of multiple auxiliary control units configured to control different types of smart home equipment, according to some embodiments. In the example shown, thermostat 102 is connected via wires 480 to the AHCU 460, which is in turn used to control the HVAC system 103A via wires 490, as has been described herein.

The RS-422 port of AHCU 460 is then used to connect the RS-422 port of an auxiliary irrigation system control unit (AICU) 920 via wires 912. The AICU 920 is very similar to the AHCU 460 as described herein, and can include many of the same features including the "train-map" type display on the front panel of AICU 920. The AICU is configured to control a number of irrigation control units 930, 932 and 934, which in turn are used to control irrigation control valves, such as valve 936 being controlled by irrigation control unit 930. Through a cascaded arrangement of auxiliary control units such as shown, which can include additional other types of auxiliary control units configured to control other smart home equipment, a single thermostat 102 can be used to control a very wide variety and larger numbers of individual devices that each use different types of communication protocols. Additionally, the thermostat 102 has access to various information via link to other networks such a shown in FIGS. 2-3, which can advantageously be used. For example the current weather and forecast weather information can be used in adjusting the irrigation controllers 930, 932 and 934.

Figure 10A:
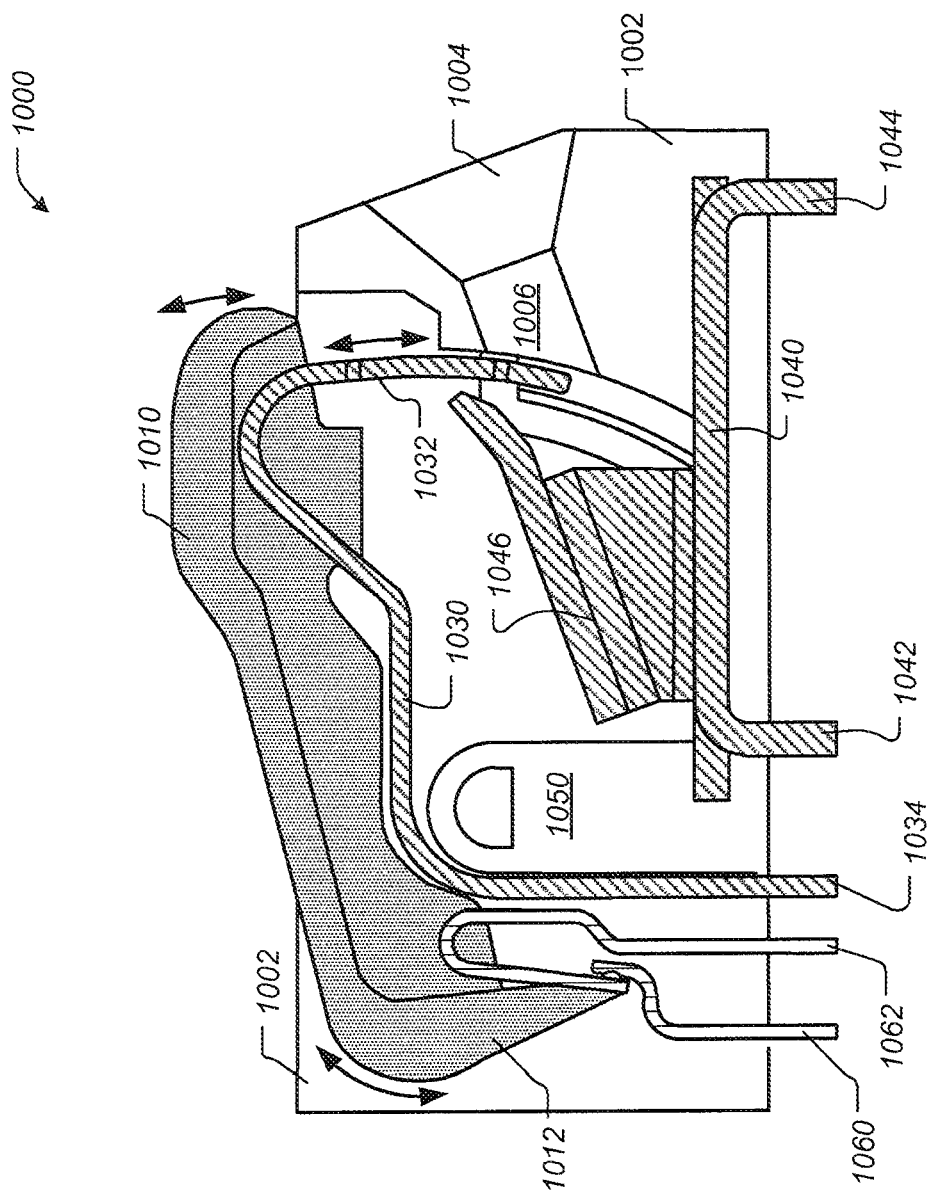
FIGS. 10A and 10B show a thermostat connector with automatic switching of independent circuits, according to some embodiments.
Figure 10B:
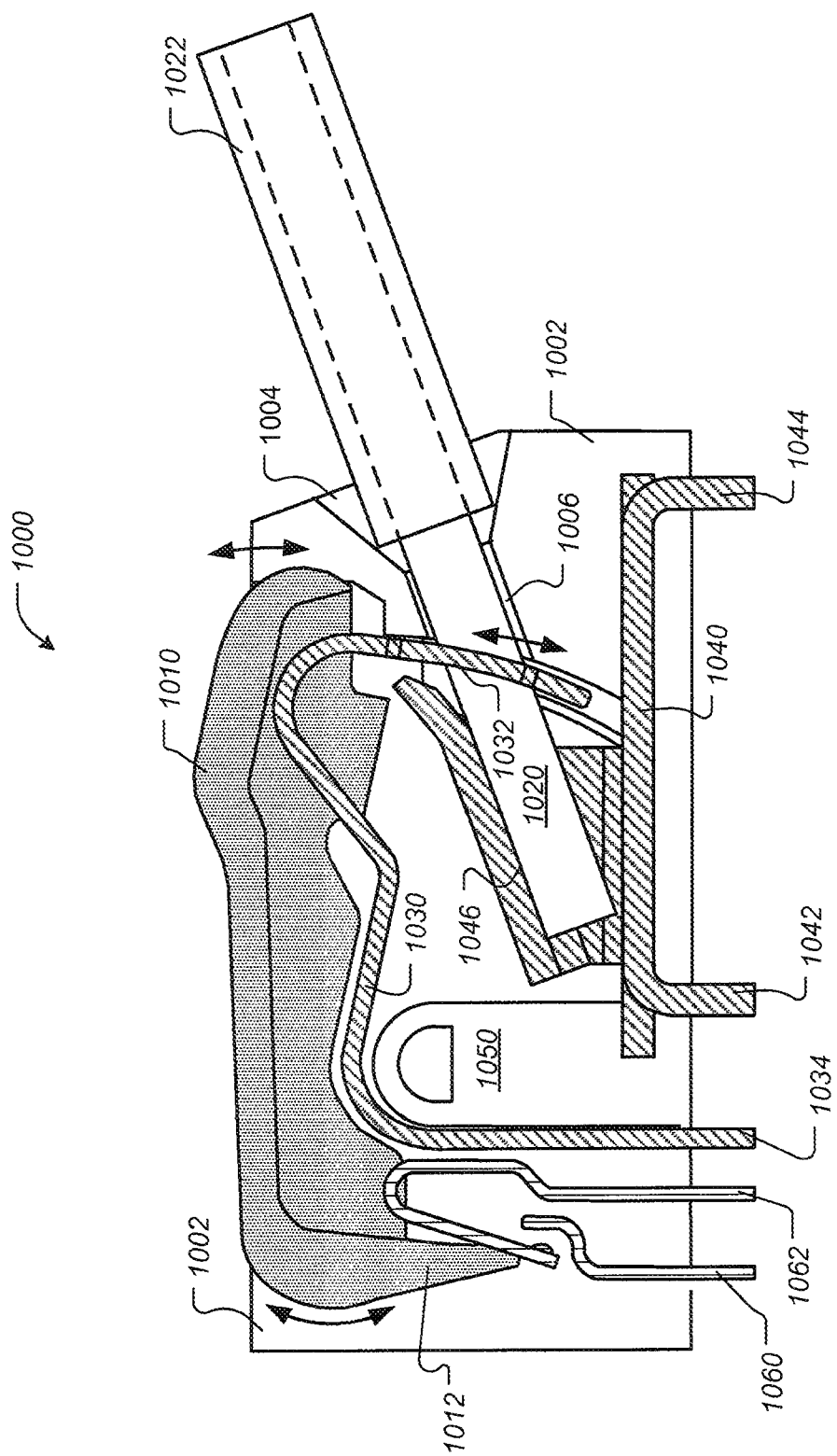

FIGS. 10A and 10B show a thermostat connector with automatic switching of independent circuits, according to some embodiments. FIG. 10A is a side view of the connector 1000. The connector 1000 has a body 1002 that has a conical opening 1004 and a cylindrical opening 1006 which accepts an HVAC wire conductor (not shown). The connector 1000 includes a push button 1010 to actuate a first primary conductor 1030. The first primary conductor 1030 is made of metal is shaped so as to be stable in the position shown in FIG. 10A. The conductor 1030 can be electrically connected to a circuit board via pin 1034. The conductor 1030 includes a window 1032 that is shaped and dimensioned to accept an HVAC wire conductor when the window 1032 is positioned so as to be aligned with the cylindrical opening 1006. The window 1032 can be translated down by applying downward force on the button 1010 which deforms conductor 1030 which pivots on fulcrum member 1050. The conductor 1030 has a spring force that tends to resist the downward force on button 1010 to return the button 1010 and the conductor 1030 to return to the position shown in FIG. 10A. A second primary conductor 1040 is fixedly mounted within the connector 1000 and can be electrically connected to a circuit board using pins 1042 and or 1044. The conductor 1040 is "C" shaped and has an upper flat angled portion 1046 that will accept and make electrical contact with an HVAC wire conductor.

The connector 1000 also includes one or more pairs of secondary conductors such as secondary conductor 1060 and 1062. The two conductors within each secondary conductor pair are in contact with one another when there is no HVAC wire conductor inserted in connector 1000, such as shown in the FIG. 10A. In FIG. 10A, the rear lever portion 1012 of button 1010 pushed on a portion conductor 1062 so as to be in electrical contact with conductor 1060. The secondary conductors 1060 and 1062 are connected to a circuit board via the lower pin portions of each conductor. Thus, when an HVAC wire conductor is not inserted in the connector 1000, as shown in FIG. 10A, the spring force of primary conductor 1030 maintains pressure on button 1010 which maintains contact between conductors 1060 and 1062 via lever portion 1012.

FIG. 10B shows a side view of the connector 1000 with an HVAC wire conductor 1020 inserted, according to some embodiments. The HVAC wire conductor 102 has an insulated portion 1022 that is stripped away so as to expose a sufficient amount of conductor 1020 for secure insertion and connection with connector 1000. The wire conductor 1020 is inserted as shown through the cylindrical opening of body 1002 and through the window portion 1032 of first primary conductor 1030. The HVAC wire conductor 1020 is also held in place by contacting the upper flat portion 1046 of the second primary conductor 1040. The spring force from the deformation of conductor 1030 acts to urge the wire 1020 into contact with both the lower portion of the window of conductor 1030 and the lower surface of the upper flat portion 1046 of conductor 1040. The wire 1020 is thus maintained securely in connector 1000 and in electrical contact with both conductor 1030 and conductor 1040.

When an HVAC wire conductor is inserted in connector 1000, as shown in FIG. 10B, the lever portion 1012 of button 1010 is positioned as shown such that the secondary conductors 1060 and 1062 are not in contact with one another. In particular, the conductor 1062 is shaped such that it exerts a spring force towards the lever portion 1012 and away from the upper portion of conductor 1060. Thus, when the HVAC wire conductor is inserted in the connector 1000 the contact between conductor 1060 and 1062 is broken.

Various other modifications may be made without departing from the spirit and scope of the invention. It is to be further appreciated that the term thermostat, as used hereinabove and hereinbelow, can include thermostats having direct control wires to an HVAC system, and can further include thermostats that do not connect directly with the HVAC system, but that sense an ambient temperature at one location in an enclosure and cooperatively communicate by wired or wireless data connections with a separate thermostat unit located elsewhere in the enclosure, wherein the separate thermostat unit does have direct control wires to the HVAC system. Accordingly, the invention is not limited to the above-described embodiments, but instead is defined by the appended claims in light of their full scope of equivalents.

What is claimed is:

1. A thermostat comprising:
   a plurality of wiring terminals adapted to make electrical connections with a first plurality of wires running between a first location where the thermostat is installed and a second location where a Heating, Ventilation, and Air Conditioning (HVAC) system is installed; and
   a processor coupled to the plurality of wiring terminals and programmed to:
      determine whether an intermediate HVAC control unit is installed and the first plurality of wires connects the plurality of wiring terminals to the intermediate HVAC control unit, or whether the intermediate HVAC control unit is not installed and the first plurality of wires connects the plurality of wiring terminals directly to the HVAC system;
      operate in a first mode to control the HVAC system directly when it is determined that the intermediate HVAC control unit is not installed; and
      operate in a second mode to control the HVAC system indirectly when it is determined that the intermediate HVAC control unit is installed, such that the thermostat communicates with the intermediate HVAC control unit, and the intermediate HVAC control unit communicates with the HVAC system.

2. The thermostat according to claim 1 further comprising a wireless communication module configured to communicate wirelessly with the intermediate HVAC control unit.

3. The thermostat according to claim 1 further comprising a wireless communication module configured to communicate wirelessly with at least one other unit within an enclosure where the thermostat is installed.

4. The thermostat according to claim 1 wherein the processor is further programmed to communicate with the intermediate HVAC control unit bi-directionally using a serial communication protocol.

5. The thermostat according to claim 1 wherein determining whether the intermediate HVAC control unit is installed is based at least in part on an assessment of which of the plurality of wiring terminals have wires connected thereto.

6. A method comprising:
   detecting, at a plurality of wiring terminals of a thermostat, a first plurality of wires, wherein the first plurality of wires runs between a first location where the thermostat is installed and a second location where a Heating, Ventilation, and Air Conditioning (HVAC) system is installed;
   determining, at the thermostat, whether an intermediate HVAC control unit is installed and the first plurality of wires connects the plurality of wiring terminals to the intermediate HVAC control unit, or whether the intermediate HVAC control unit is not installed and the first plurality of wires connects the plurality of wiring terminals directly to the HVAC system;
   operating the thermostat in a first mode to control the HVAC system directly when it is determined that the intermediate HVAC control unit is not installed; and
   operating the thermostat in a second mode to control the HVAC system indirectly when it is determined that the intermediate HVAC control unit is installed, such that the thermostat communicates with the intermediate HVAC control unit and the intermediate HVAC control unit communicates with the HVAC system.

7. The method according to claim 6 further comprising communicating wirelessly with the intermediate HVAC control unit.

8. The method according to claim 6 wherein when the intermediate HVAC control unit is installed, the first plurality of wires connecting the plurality of wiring terminals to the intermediate HVAC control unit is fewer in number than a second plurality of wires connecting the intermediate HVAC control unit to the HVAC system.

9. The method according to claim 6 wherein the first plurality of wires comprises at most three wires.

10. The method according to claim 6 wherein the thermostat, when mounted on a wall, occupies no more than 100 square centimeters, and the plurality of wiring terminals are configured for tool-free wire connection.

11. An intermediate Heating, Ventilation, and Air Conditioning (HVAC) control unit comprising:
   a first plurality of wiring terminals adapted to make electrical connections with a first plurality of wires running between a first location where a thermostat is installed and the intermediate HVAC control unit;
   a second plurality of wiring terminals adapted to make electrical connections with a second plurality of wires running between the intermediate HVAC control unit and an HVAC system, wherein the thermostat is installed at the first location, and the intermediate HVAC control unit and the HVAC system are installed at a second location;
   connection circuitry configured to selectively connect ones of the first plurality of wiring terminals to ones of the second plurality of wiring terminals;
   a processor programmed to receive communications from the thermostat, wherein the connection circuitry connects the ones of the first plurality of wiring terminals to the ones of the second plurality of wiring terminals according to the communications from the thermostat.

12. The intermediate HVAC control device according to claim 11, wherein the intermediate HVAC control unit is mounted directly on a housing of the HVAC system.

13. The intermediate HVAC control device according to claim 11, further comprising a graphic display comprising a plurality of visible indicators that indicate which ones of the first plurality of wiring terminals are connected to the ones of the second plurality of wiring terminals.

14. The intermediate HVAC control device according to claim 13, further comprising a housing, wherein the graphic display further comprises lines representing conductors silk-screened onto the housing.

15. The intermediate HVAC control device according to claim 11, further comprising one or more wiring terminals adapted to make electrical connection to one or more wires leading to one or more remote temperature sensors.

16. The intermediate HVAC control device according to claim 15, wherein the one or more remote temperature sensors measure one or more temperatures selected from a group consisting of: outdoor air temperature, indoor air temperature, and return air temperature.

17. The intermediate HVAC control device according to claim 11, further comprising a wireless communication module configured to wirelessly communicate with at least one other device located with an enclosure conditioned by the HVAC system.

18. The intermediate HVAC control device according to claim 11, wherein the first plurality of wiring terminals are further adapted to make an electrical connection to a second thermostat installed at a third location.

19. The intermediate HVAC control device according to claim 11, further comprising circuitry for generating a pulse-width-modulated control signal for controlling variable speed on an HVAC component.

20. The intermediate HVAC control device according to claim 11, further comprising circuitry for supplying electrical power to the thermostat through the first plurality of wiring terminals, the electrical power not being switched in order to control HVAC functions.

\* \* \* \* \*